United States Patent
Iizuka

(10) Patent No.: US 7,724,353 B2
(45) Date of Patent: May 25, 2010

(54) METHOD FOR MEASURING DISTANCE TO OBJECT

(75) Inventor: Nobuo Iizuka, Hamura (JP)

(73) Assignee: Casio Computer Co., Ltd., Tokyo (JP)

(*) Notice: Subject to any disclaimer, the term of this patent is extended or adjusted under 35 U.S.C. 154(b) by 34 days.

(21) Appl. No.: 11/890,179

(22) Filed: Aug. 3, 2007

(65) Prior Publication Data

US 2008/0030711 A1 Feb. 7, 2008

(30) Foreign Application Priority Data

| Aug. 3, 2006 | (JP) | ............................. 2006-211589 |
| Sep. 27, 2006 | (JP) | ............................. 2006-261988 |
| Sep. 27, 2006 | (JP) | ............................. 2006-262078 |

(51) Int. Cl.
  *G01C 3/08* (2006.01)
(52) U.S. Cl. ...................... 356/4.03; 356/3.01; 356/3.1; 356/4.01; 356/4.1
(58) Field of Classification Search ........ 356/3.01–28.5
See application file for complete search history.

(56) References Cited

U.S. PATENT DOCUMENTS

| 3,617,128 | A | * | 11/1971 | Harvey ....................... 356/4.03 |
| 5,929,980 | A | * | 7/1999 | Yamaguchi et al. ......... 356/4.03 |
| 6,553,288 | B2 | | 4/2003 | Taguchi et al. |
| 6,577,249 | B1 | | 6/2003 | Akatsuka et al. |
| 2005/0206874 | A1* | | 9/2005 | Dougherty .................. 356/4.05 |
| 2006/0176468 | A1* | | 8/2006 | Anderson et al. ........... 356/5.01 |

FOREIGN PATENT DOCUMENTS

| JP | 63-266382 A | 11/1988 |
| JP | 09-096528 A | 4/1997 |
| JP | 10-90591 A | 4/1998 |
| JP | 2001-118187 A | 4/2001 |
| JP | 2001-143199 A | 5/2001 |
| JP | 2001-194141 A | 7/2001 |
| JP | 2001-245253 A | 9/2001 |
| JP | 2005-77291 A | 3/2005 |

OTHER PUBLICATIONS

Japanese Office Action (and English translation thereof) dated Apr. 24, 2008, issued in a counterpart Japanese Application.

* cited by examiner

*Primary Examiner*—Thomas H Tarcza
*Assistant Examiner*—Luke D Ratcliffe
(74) *Attorney, Agent, or Firm*—Frishauf, Holtz, Goodman & Chick, P.C.

(57) ABSTRACT

A method for calculating a distance to an object is provided. In this method, whether luminances received by at least one light receiving elements of a plurality of light receiving elements are equal to or higher than a predetermined value is determined. When luminances received by at least one light receiving elements are equal to or higher than a predetermined value, whether the luminances change in a time-series manner or not is determined. When the luminances change in a time-series manner, information is acquired from the time-series change. Then, a size of a light receiving region is detected based on a ratio of a light receiving element having received luminance with a predetermined value or more to the plurality of light receiving element. Based on the size of the light receiving region and the acquired information, the distance to the object is calculated.

17 Claims, 24 Drawing Sheets

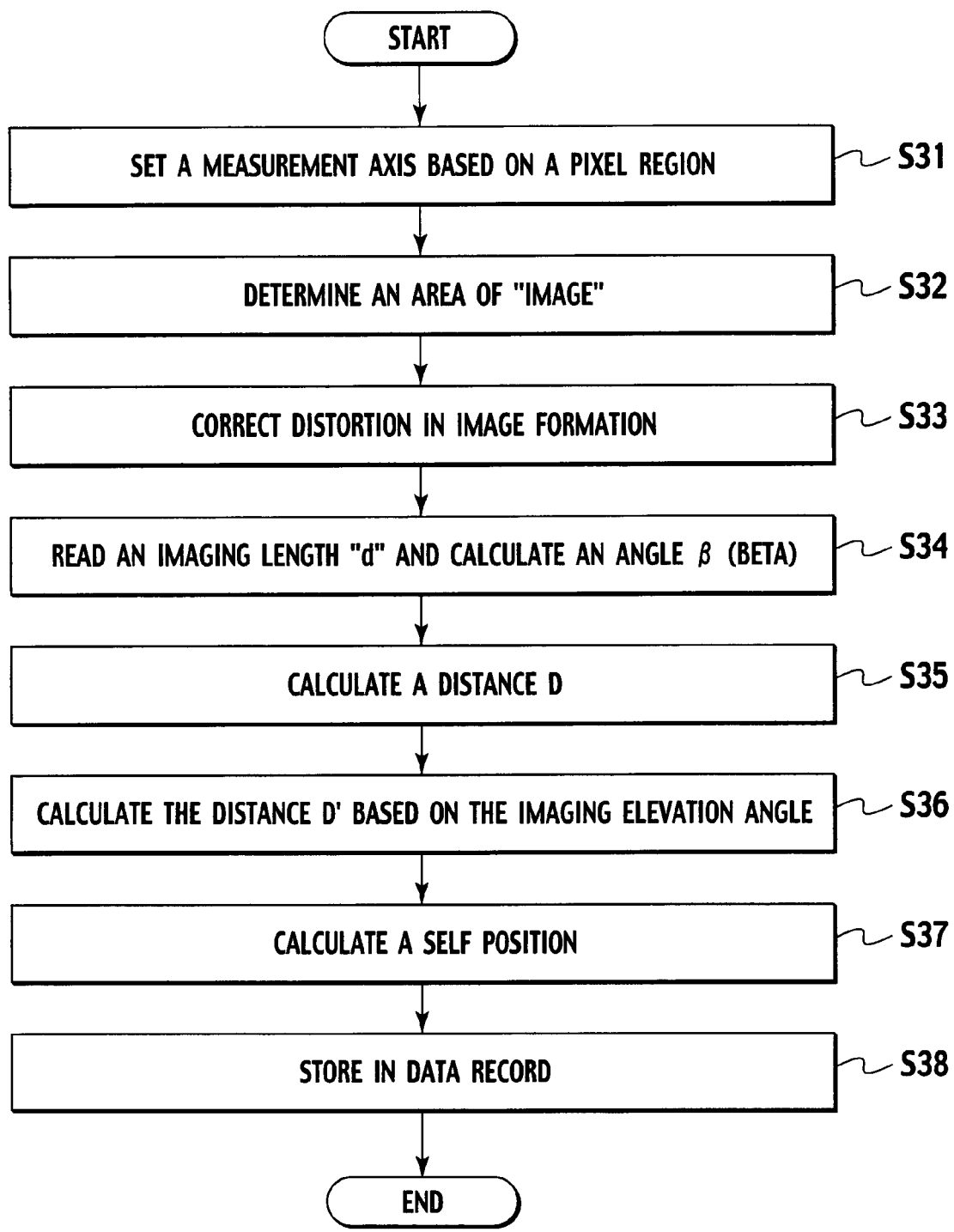

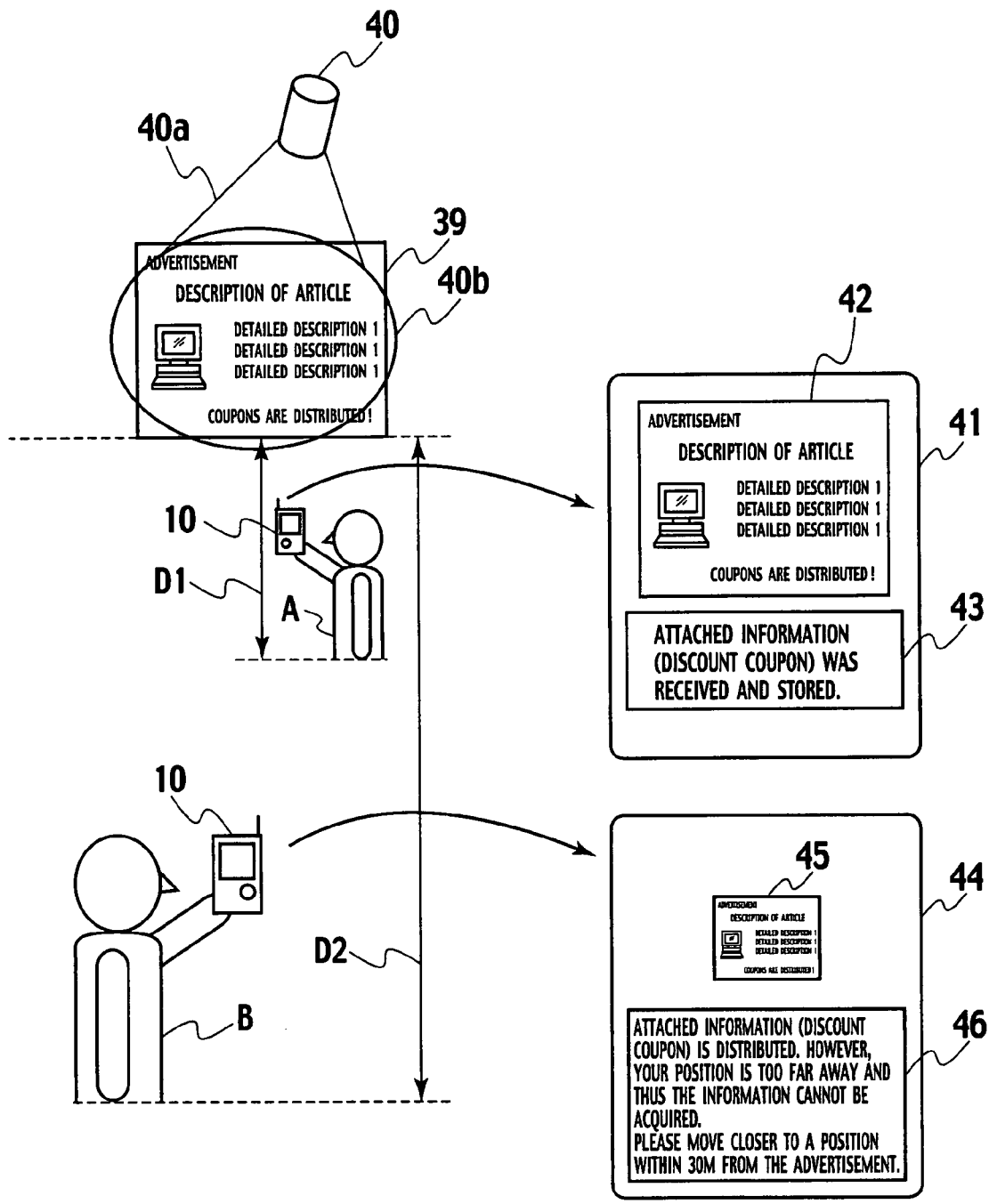

| 48a | 48b |
|---|---|
| 0 | 20 |
| 10 | 0 |
| 5 | 30 |
| 0 | 0 |

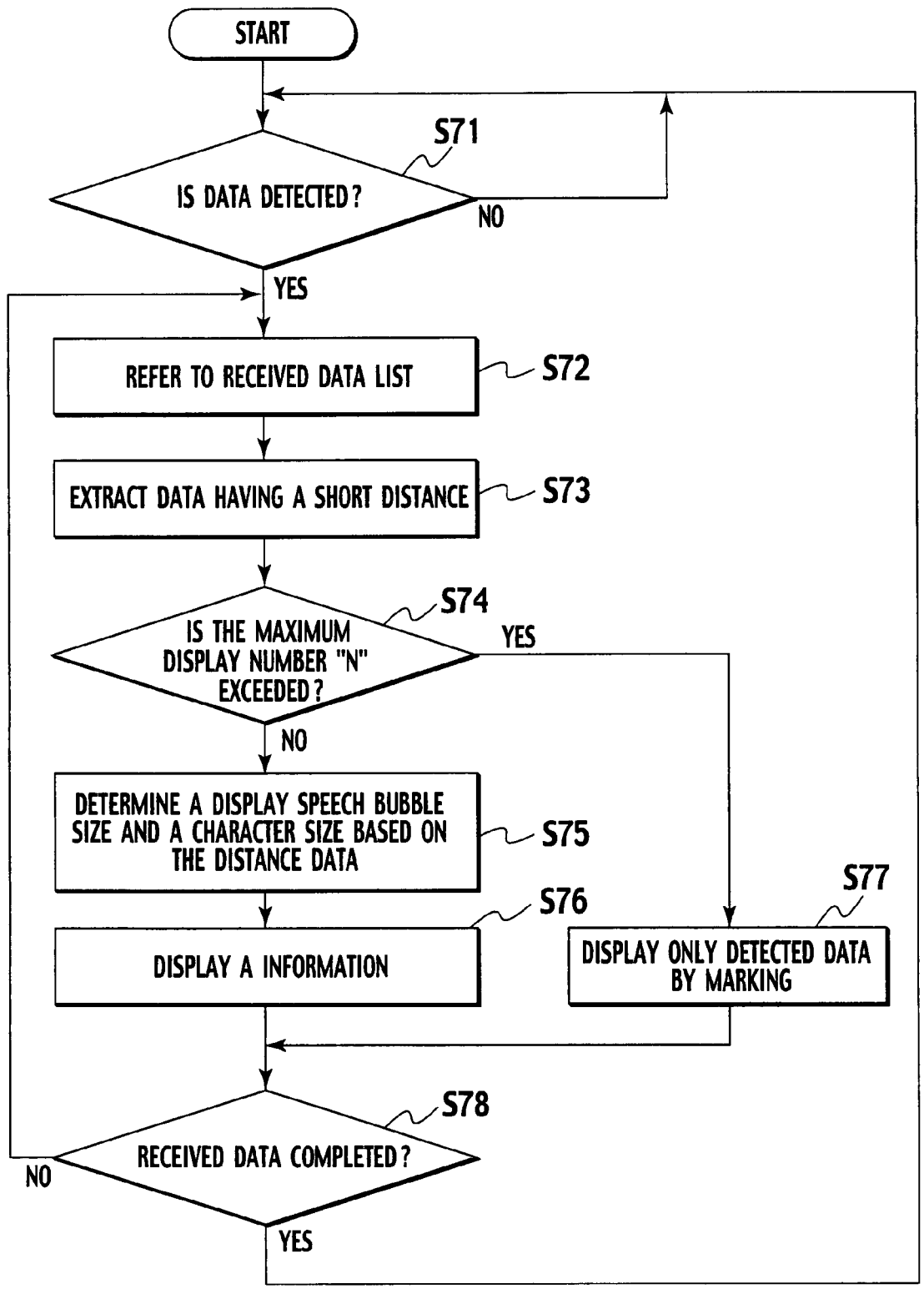

METHOD FOR MEASURING DISTANCE TO OBJECT

CROSS REFERENCE TO RELATED APPLICATIONS

This application is based upon and claims the benefit of priority from a Japanese Patent Application No. TOKUGAN 2006-211589, filed on Aug. 3, 2006, a Japanese Patent Application No. TOKUGAN 2006-261988, filed on Sep. 27, 2006, and a Japanese Patent Application No. TOKUGAN 2006-262078, filed on Sep. 27, 2006; the entire contents of which are incorporated herein by reference.

BACKGROUND OF THE INVENTION

1. Field of the Invention

The present invention relates to a method for measuring a distance to an object.

2. Description of the Related Art

A distance measurement apparatus has been known as disclosed in Japanese Laid-Open Publication No. S63-266382 that measures a distance to an arbitrary target (measurement object) based on a difference between a time at which laser light is irradiated to the target and a time at which the reflected light is received. By combining this distance measurement apparatus with a compass, a direction measurement apparatus can be structured that measures a direction of the target seen from a measurement point. A position measurement apparatus is also known as disclosed in Japanese Laid-Open Publication No. 2005-77291 that measures, based on electric waves from a plurality of GPS satellites on a geosynchronous orbit, a position on earth (latitude, longitude, and altitude).

The above known techniques have the following problems. Specifically, the distance measurement apparatus uses laser light that is hazardous to a human body (because laser light may damage optic nerves) and thus has a problem in safety. The position measurement apparatus using GPS satellites cannot be used in a place to which an electric wave cannot reach (e.g., indoor).

SUMMARY OF THE INVENTION

According to the present invention, whether luminances received by at least one light receiving elements of a plurality of light receiving elements are equal to or higher than a predetermined value is determined. When it is determined that luminances received by at least one light receiving elements are equal to or higher than a predetermined value, whether the luminances changes in time-series manner or not is determined. When it is determined that the luminances changes in time-series manner, information is acquired from the time-series change. Then, a size of a light receiving region is detected based on a ratio of a light receiving element having received luminance with a predetermined value or more to the plurality of light receiving elements. Then, a distance to an object is calculated based on the size of the light receiving region and the acquired information.

According to the present invention, a distance to an object is measured without using laser light. Thus, a distance to an object can be measured without causing a safety problem. According to the present invention, a distance to an object is measured without using an electric wave from a GPS satellite. Thus, a distance to an object can be measured without being influenced by ambient environment.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 8 is a flowchart illustrating the flow of a processing by a measurement processing block S3 shown in FIG. 7;

FIG. 11 is a conceptual diagram illustrating an application example of a system consisting of an advertisement exhibit and an imaging apparatus;

FIG. 24 shows a flow of a processing for obtaining the example of the screen display shown in FIG. 23.

DETAILED DESCRIPTION OF THE PREFERRED EMBODIMENTS

First Embodiment

First, an imaging apparatus for example an electronic camera according to first embodiment of the present invention will be described with regards to the structure.

Figure 1:
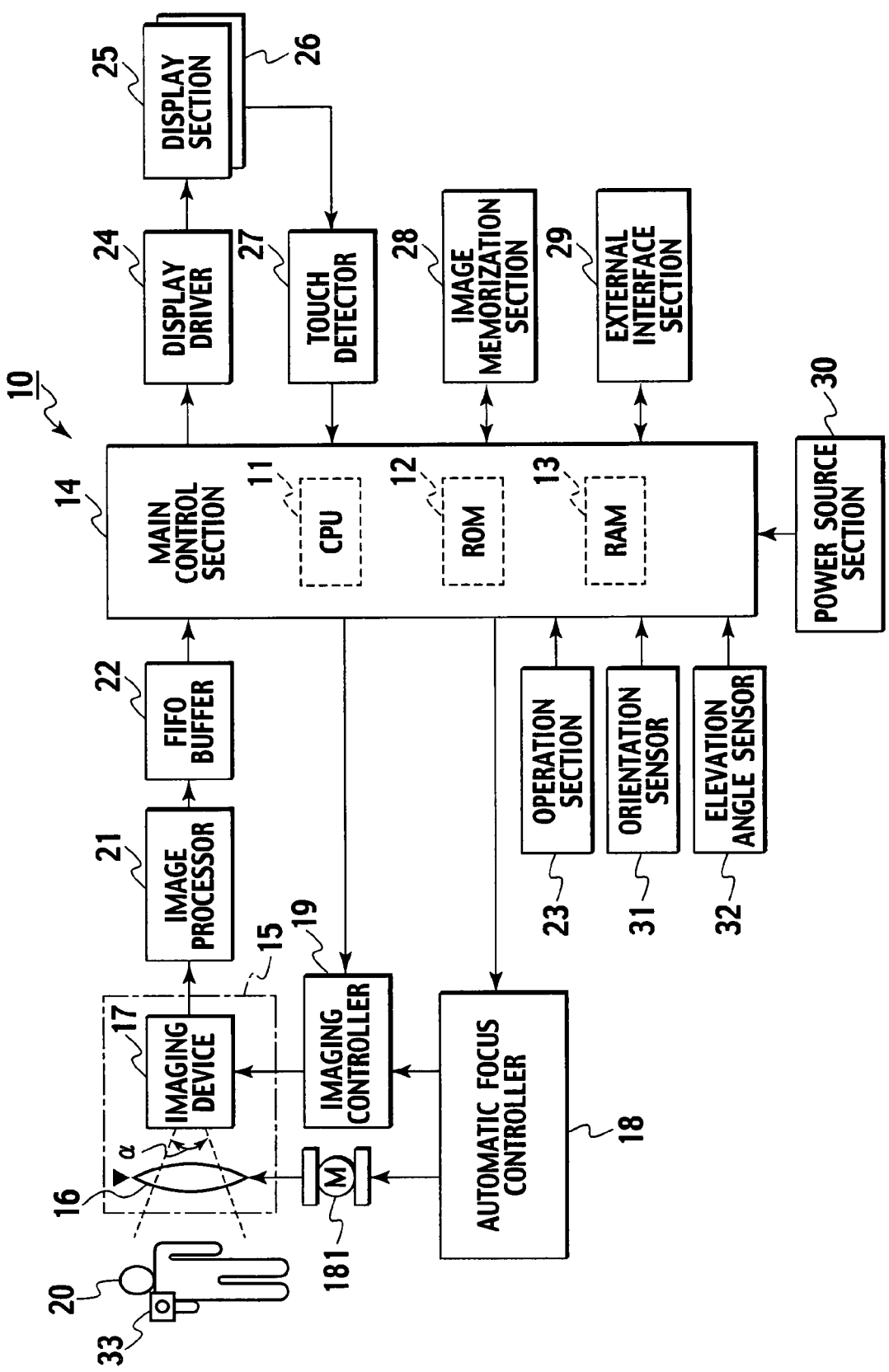
FIG. 1 is a block diagram illustrating an imaging apparatus according to first embodiment of the present invention.

As shown in FIG. 1, an imaging apparatus 10 according to first embodiment of the present invention includes a main control section 14 including a CPU 11, a ROM 12, and a RAM 13 as well as various peripheral circuits (not shown) or the like, and at least the respective sections as described below that are appropriately arranged to surround the main control section 14 and that are required for the operation of the imaging apparatus 10. The main control section 14 typically consists of a one-chip microprocessor.

An imaging section 15 is composed of an optical system 16 and an imaging device 17. The optical system 16 includes a photographing lens, an aperture mechanism, a focusing mechanism, and a zoom mechanism for example. The imaging device 17 consists of a two-dimensional image sensor such as a CCD sensor or a CMOS sensor. An operation of an imaging processor 21 (aperture size or zoom multiplication factor (i.e., adjustment and focusing of photographing angle of view a as well as exposure and reading of imaging device 17)) is controlled by an imaging controller 19. The imaging controller 19 operates in accordance with photographing operation instructions from the main control section 14 and an automatic focus controller 18 including a step motor 181. A photographing operation instruction from the main control section 14 may be, for example, a frame image reading operation instruction for reading a frame image having a predetermined frame rate (e.g., a frame rate of few dozens to few hundreds per second) for checking a photographing picture composition (for a so-called through image) or for video photographing, a photographing operation instruction for photographing a high resolution still image, and a previous operation instruction for setting an aperture value or a zoom multiplication factor required for these operations. A photographing operation instruction from the automatic focus controller 18 is an operation instruction for the focusing of an optical system 16.

In response to a photographing operation instruction from the main control section 14, the image processor 21 periodically reads a frame image for checking a photographing structure or video with the above frame rate or reads a high resolution frame image of a still image. These frame images are converted by the image processor 21 to digital signals and are subjected to a predetermined image processing (e.g., gamma compensation processing) and are subsequently inputted to the main control section 14 via a FIFO buffer 22.

The operation section 23 includes, for example, various controllers required for an input interface of the operation imaging apparatus 10 (e.g., a power source switch, a switch for switching between image photographing mode and image reproduction mode, a shutter button for performing still image and video photographing, a menu button for displaying various setting menus, a selection button for selecting a menu item or for selecting an image to be reproduced in an image reproduction mode).

[0015-B]

A display driver 24 converts various pieces of display data outputted from the main control section 14 (e.g., through image display data, menu screen display data, image reproduction screen display data) to have a predetermined display format and outputs converted data to a display section 25 constituted by a flat display device (e.g., liquid crystal display). This display section 25 includes a touch panel 26. The touch detector 27 detects a position coordinate where a contact between the touch panel 26 and a finger or a pen for example is detected, and outputs the detection result to the main control section 14.

An image memorization section 28 is constituted by a nonvolatile high-capacity memorization apparatus (e.g., flash memory, hard disk, or optical disk). The term "nonvolatile" herein means that contents memorized in the apparatus are not lost even when the power source is turned OFF. The image memorization section 28 is mainly used to accumulate and store images photographed by this imaging apparatus 10. The respective accumulated and stored images are a compressed file based on a JPEG format for example or an uncompressed raw data file (so-called RAW file) for example. A region in which these images are stored may be positioned just below a route in a file system or may be positioned at a folder in a single layer or a plurality of layers appropriately prepared just below the route. This image memorization section 28 may be provided as the fixed one or also may be a general-purpose memory device that is detachable from the imaging apparatus 10 to be attached to a personal computer (not shown).

An external interface section 29 is a data input/output section corresponding to a general-purpose protocol (e.g., USB, IEEE1394) for example. Through this external interface section 29, a photographed image can be optionally transferred to a personal computer (not shown) for example (e.g., an image accumulated and stored in the image memorization section 28 can be transferred to the personal computer) or can be read from a personal computer (e.g., the image can be read to the image memorization section 28 from the personal computer).

A power source section 30 includes a rechargeable secondary battery or a disposable primary battery and supplies a power source voltage required for the operations of the respective sections of the imaging apparatus 10 (e.g., main control section 14).

An orientation sensor 31 and an elevation angle sensor 32 both detect a photographing direction of this imaging apparatus 10 (direction of a light axis of an optical system 16). The orientation sensor 31 detects the orientation assuming that a magnetic north is 0 degree. The elevation angle sensor 32 detects an elevation angle (or a depression angle) based on an assumption that a horizontal direction is 0 degree.

Although the shown photographic subject 20 represents a human, this is a mere example. The important thing is that the position of this photographic subject 20 has a light emitting object 33 that transmits arbitrary data subjected to luminance modulation (the details of which will be described later) via light. Although the details will be described later, the imaging apparatus 10 uses the imaging device 17 to receive an image including this light emitting object 33 in a time-series manner (or to photograph the image continuously) and demodulates data included in a luminance modulation region of the light emitting object 33 as a measurement target included in the image. Then, the imaging apparatus 10 calculates a distance D to the light emitting object 33 based on the received image and the demodulated data.

Figure 2:
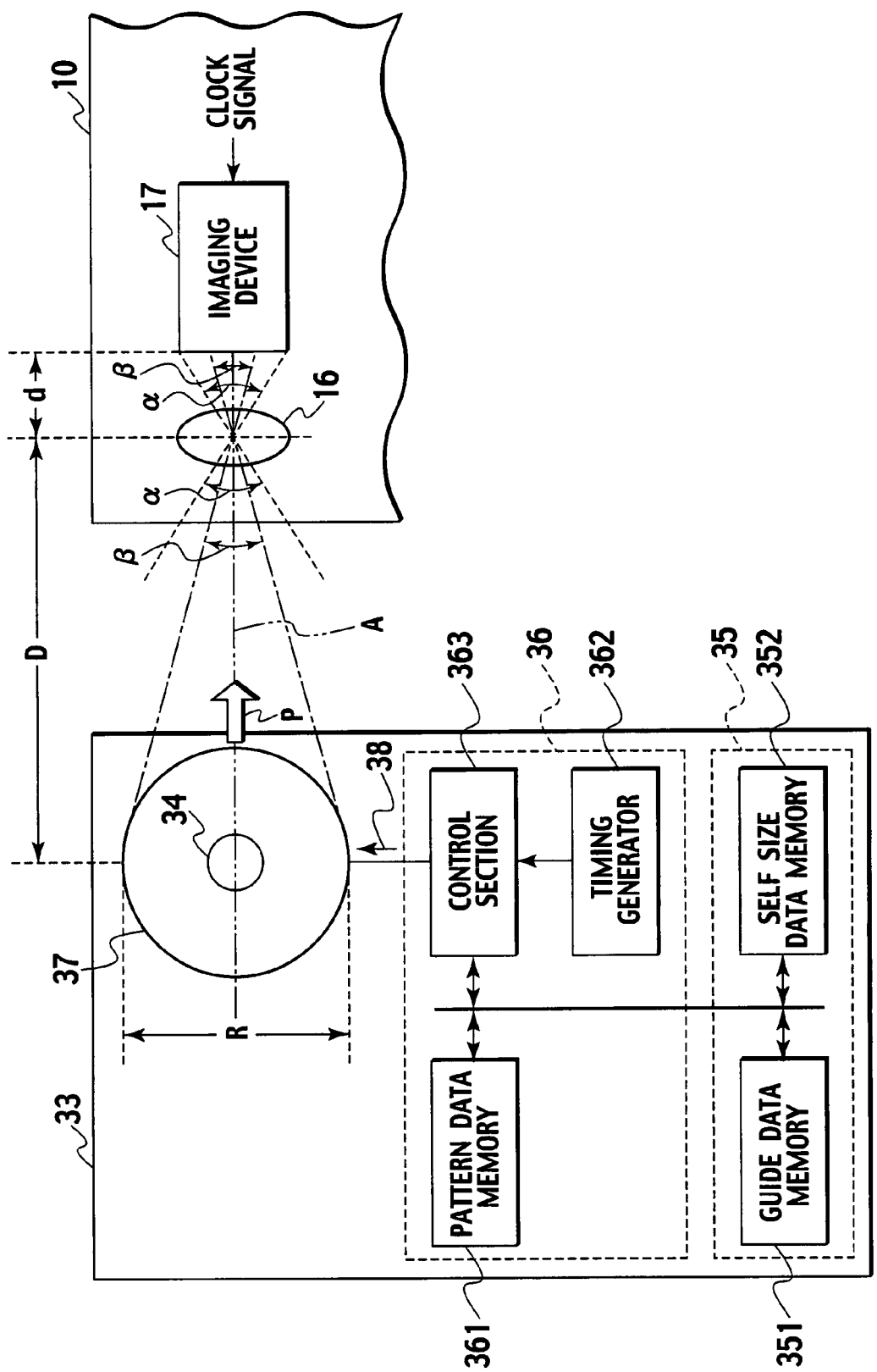
FIG. 2 is a schematic diagram illustrating the structure of a light emitting object shown in FIG. 1.

FIG. 2 shows the structure of the light emitting object 33. In FIG. 2, the light emitting object 33 includes a luminous source 34 for emitting light in a visible light region; a data memory 35 for storing data to be transmitted; a luminous control section 36 for modulating data stored in this data memory 35 and controlling the luminance degree of the light source 34 according to modulation information; and a luminance window 37 having a predetermined shape and a predetermined size. The data memory 35 includes a guide data memory 351 for retaining arbitrary information and a self size data memory 352 for retaining shape data of the luminance window 37 ("circular shape" in this case) and size data of the luminance window 37 (diameter "R" of the circular shape) and position data of the light emitting object 33 (latitude, longitude, and altitude).

The luminous control section 36 includes: a pattern data memory 361, a timing generator 362; and a control section 363. The pattern data memory 361 retains two types preamble data of preamble data for detection and acquisition (for measurement) and preamble data for detection and acquisition (for data body); and two different types of luminance change pattern (hereinafter referred to as the first pattern sequence SA and the second pattern sequence SB).

The timing generator 362 generates a stable clock signal having a predetermined cycle. This clock signal is synchronized with a clock signal of the imaging device 17 of the imaging apparatus 10.

The control section 363 repeats an operation as described below in synchronization with a clock signal from the timing generator 362. The control section 363 sequentially reads bit data stored in the pattern data memory 361, the guide data memory 351, and the self size data memory 352 to determine the bit value (whether the bit value is data "1" or data "0"); reads the first pattern sequence SA from the pattern data memory 361 when the bit value is data "1"; reads the second pattern sequence SB from the pattern data memory 361 when the bit value is data "0"; and outputs the first pattern sequence SA or the second pattern sequence SB to the light source 34. The control section 363 repeats this operation in an amount of bit count of data to be transmitted.

The light source 34 emits light at a timing corresponding to "1" in the first pattern sequence SA and the second pattern sequence SB and blacks out (or reduces the luminance) at a timing corresponding to "0". By such a blinking operation, the light source 34 outputs, via the luminance window 37, light P for which the luminance changes in a time-series manner.

Although FIG. 1 shows that the light emitting object 33 is carried by a person as the photographic subject 20, the photographic subject 20 also may be a fixed structure (e.g., billboard, guide plate) so that the light emitting object 33 can be provided to each fixed structure. In this case, data memorized in the data memories 35 of the respective light emitting objects 33 also may be downloaded from a server provided in a building or at the exterior of the building via a network (e.g., LAN). Although the light source 34 is designed to perform a blinking operation at pattern sequences "1" and "0", the light source 34 also may designed, when a pattern sequence includes data of multiple values, to emit light at a plurality of levels in addition to "lighting" and "black out".

As described above, the data memory 35 stores therein, as data to be transmitted, at least shape data showing the shape of this light emitting object 33 and size data for the light emitting object 33. This will be described with reference to FIG. 2 for example. The data memory 35 stores therein the shape data showing that the luminance window 37 has a "circular shape" and the size data showing that the luminance window 37 has a diameter "R", respectively. These pieces of data are modulated by the luminous control section 36. The luminous control section 36 desirably modulates the shape data and the size data to be transmitted by, for example, assuming the above shape data ad size data as binary digital data consisting of a logic 0 and a logic 1 to allocate a luminance change pattern (the first pattern sequence SA) having the corresponding time series to the data "0" and to allocate a luminance change pattern (the second pattern sequence SB) having different time series from that of the above data "0" to the data "1". These two luminance change patterns are desirably changed with an identical cycle and are changed at a cycle different from cycles existing in the natural world such as a cycle standardized by a commercial power source or disturbance light.

On the other hand, the imaging apparatus 10 has the structure as described above (see FIG. 1) and can appropriately perform an "imaging function" to photograph a still image or video to accumulate and store the image file in the image memorization section 28 and optionally a "reproduction function" to read an arbitrary image file accumulated and stored in the image memorization section 28 to cause the image to be reproduced and displayed on the display section 25. This imaging apparatus 10 also can perform a "distance measurement function" according to the present invention. In this "distance measurement function", the imaging apparatus 10 acquires in a time-series manner an image including light from the light emitting object 33 at the position of the photographic subject 20; demodulates, as a measurement target included in the image, data included in a luminance modulation region of the light emitting object 33; and measures, based on the acquired image and the demodulated data, a distance D to the light emitting object 33.

This "distance measurement function" is mainly provided by the function of the main control section 14. Specifically, the main control section 14 controls the respective parts of the imaging apparatus 10. In this embodiment, the main control section 14 particularly controls: a control of an acquisition cycle by the imaging device 17; the reading of data memorized in the FIFO buffer 22; and the measurement of the distance D to the light emitting object 33 based on the size of the image of the light emitting object 33 formed in the light receiving face 17a of the imaging device 17a, and shape data and size data demodulated by a signal demodulation section 14c (which will be described later); and various processings using the measurement result.

Figure 3A:
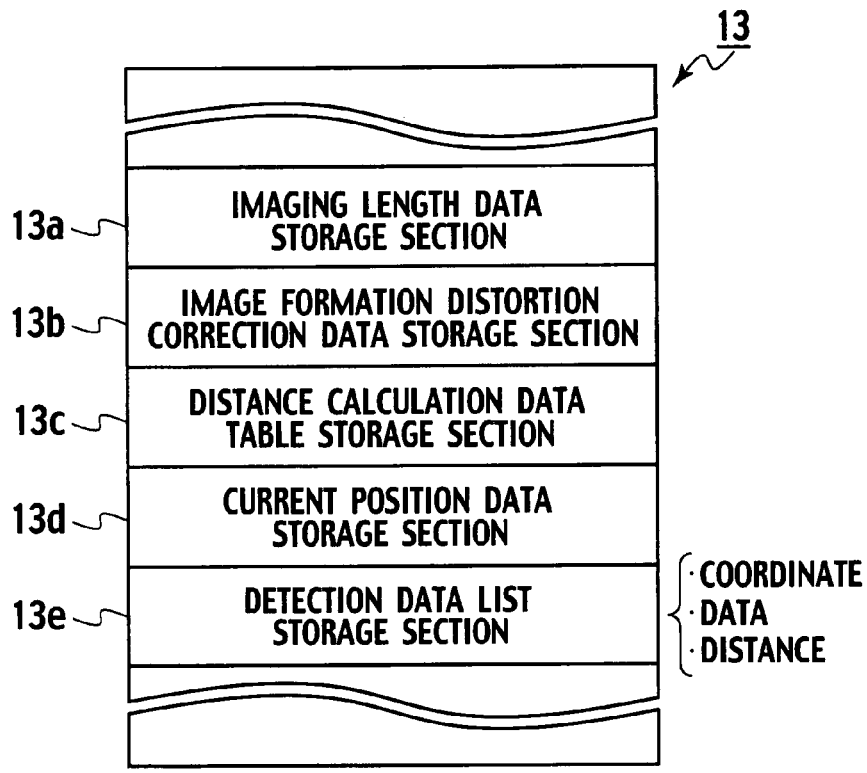
FIGS. 3A and 3B are a conceptual diagram illustrating a part of a memorization space of a RAM of a main control section and some functional blocks realized by the main control section.
Figure 3B:
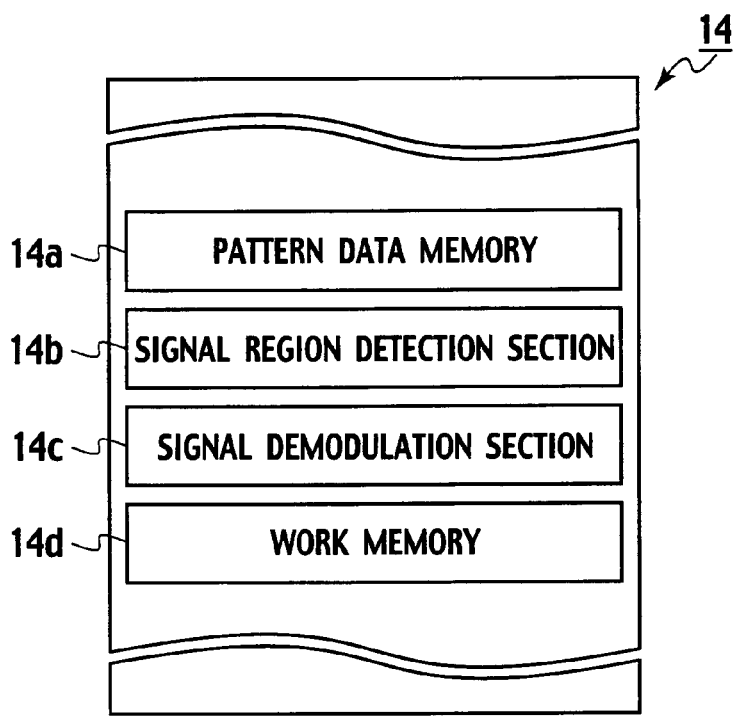

FIGS. 3A and 3B are a conceptual diagram illustrating a part of a memorization space of the RAM 13 of the main control section 14 and functional blocks realized by the main control section 14. Specifically, FIG. 3A illustrates a part of the memorization space of the RAM 13. FIG. 3B shows some functional blocks realized by the main control section 14. In FIGS. 3A and 3B, the memorization space of the RAM 13 includes the respective regions such as an imaging length data storage section 13a, an image formation distortion correction data storage section 13b, a distance calculation data table storage section 13c, and a detection data list storage section 13e. The main control section 14 includes the respective functions such as a pattern data memory 14a, a signal region detection section 14b, a signal demodulation section 14c, and a work memory 14d.

A photographing lens included in the optical system 16 is composed of one convex lens for example, and is provided so that an image including the light emitting object 33 is formed on the imaging device 17 at a later stage. In this embodiment, the image has a light axis A (see FIG. 2) at the center and has the angle of view α. The imaging device 17 is composed by an image sensor (e.g., CCD, CMOS) in which a plurality of imaging elements are arranged in a regular manner. The imaging device 17 converts the status of luminosity of the light emitting object 33 acquired in a two-dimensional manner to an electric signal by assuming that the status of luminosity is the ratio of an area of the light receiving part to the area of the light receiving face 17a (i.e., image of the imaged light emitting object 33). The imaging device 17 outputs the electric signal with a predetermined frame rate (e.g., 30 FPS) based on the control by the main control section 14. The imaging device 17 may be any device so long as the device can acquire the status of luminosity of the light emitting object 33 in the two-dimensional manner. For example, the imaging device 17 may be a device in which a plurality of light receiving elements such as photo diodes are arranged. Since the imaging device 17 are composed by image sensors such as CCD or CMOS, the reference numeral 17a is desirably called as an imaging face. However, the principle of the imaging device 17 will be described based on an assumption that the imaging device 17 is a light receiving face.

The ROM 12 memorizes various control programs executed by the CPU 11. The RAM 13 is used as an execution area of these control programs and includes a storage section of various pieces of data shown in FIG. 3 (e.g., an imaging length data storage section 13a for memorizing the imaging length d between the light receiving face 17a of the imaging device 17 and an imaging lens included in the optical system 16). In this embodiment, the optical system 16 includes one convex photographing lens provided in a fixed manner. However, an imaging apparatus including an optical zoom desirably may have a different imaging length depending on the displacement of the lens. In this case, the imaging length d is desirably an imaging length obtained by the adjustment of the position of a lens or a focusing length.

The signal demodulation section 14c is controlled by the main control section 14 to sequentially acquire, with a cycle of 30 FPS, the status of luminosity of the light emitting object 33 that is outputted in a time-series manner when the light emitting object 33 is continuously imaged by the imaging device 17 to demodulate, based on these periodically obtained statuses of luminosity of the light emitting object 33, the data subjected to luminance modulation to data stored in the data memory 35. For example, when the data is modulated by the above modulation method, the signal demodulation section 14c demodulates the data in an opposite method to obtain the shape data and size data.

The pattern data memory 14a retains, as in the pattern data memory 361 of the luminous control section 36, two types of pieces of preamble data of preamble data for detection and acquisition (for measurement) and preamble data for detection and acquisition (for data body) as well as two different types of luminance change patterns (the first pattern sequence SA and the second pattern sequence SB).

The signal region detection section 14b has a function to identify, when a pixel for which the luminance changes in a time-series manner is detected from an image signal of a plurality of frames retained in the FIFO buffer 22, a pixel region consisting of a pixel group for which the luminance changes at an identical timing with the timing of this luminance change. When a pixel having for which the luminance changes in a time-series manner is detected from an image signal of a plurality of frames retained by the FIFO buffer 22, the signal demodulation section 14c outputs bit data of "1" and "0" from the frame data corresponding to the bit length of the data format 38 sequentially and subsequently buffered to the FIFO buffer 22 depending on the luminance change of the detected pixel; determines whether these pieces of bit data correspond to any of the first pattern sequence SA and the second pattern sequence SB; outputs, when these pieces of bit data correspond to any of the first pattern sequence SA and the second pattern sequence SB, bits corresponding to this pattern; and demodulates the outputted bits to obtain size data, position data, and guide data. The work memory 14d retains an image in the imaging face of the above identified pixel region (light receiving face 17a).

The main control section 14 includes the RAM 13 for temporarily memorizing the respective pieces of data obtained by a processing (which will be described later). The main control section 14 acquires data demodulated by the signal demodulation section 14c to execute, when the data is set to a measurement mode, the measurement of a distance to the light emitting object 33 and the measurement of a current position of the imaging apparatus 10 to output the result of the measurements to the display section 25. When the data is set to a guide mode on the other hand, the main control section 14 outputs, to the display section 25, guide data that is acquired by light reception (imaging) and that is memorized in the data record of the detection data list storage section 13e. The imaging length data storage section 13a stores therein the imaging length d as described in the above description for the principle. The image formation distortion correction data storage section 13b stores therein data for correcting distortion of an image formed by the imaging device 17 due to a characteristic of the photographing lens of the optical system 16.

The distance calculation data table storage section 13c stores therein formulae (1) and (2) as described later for the principle. A current position data storage section 13d retains the self position information calculated by the main control section 14. The detection data list storage section 13e retains the distance D to the light emitting object 33 obtained by a calculation processing by the main control section 14, the self position (e.g., coordinate altitude), and guide data acquired by light reception.

The detection data list storage section 13e is a section that stores, when the light emitting object 33 is detected from an imaging face (light receiving face 17a) outputted from the imaging device 17 in a time-series manner, a distance to the light emitting object 33, the position (e.g., coordinate, altitude), and guide data. The detection data list storage section 13e in this embodiment stores such data as data record. The reason is to allow the detection data list storage section 13e to store, when a plurality of light emitting objects are detected from the imaging face (light receiving face 17a), distances, positions, and pieces of guide data separately with regards to the respective light emitting objects for example.

The calculation principle of the distance will be described. First, the diameter R is the size data for the diameter of the light emitting object 33 obtained by receiving data subjected to luminance modulation as described above. The reference mark "d" represents an imaging length. The maximum angle at which light can received by an imaging lens included in the optical system 16 is represented by "α".

Figure 4:
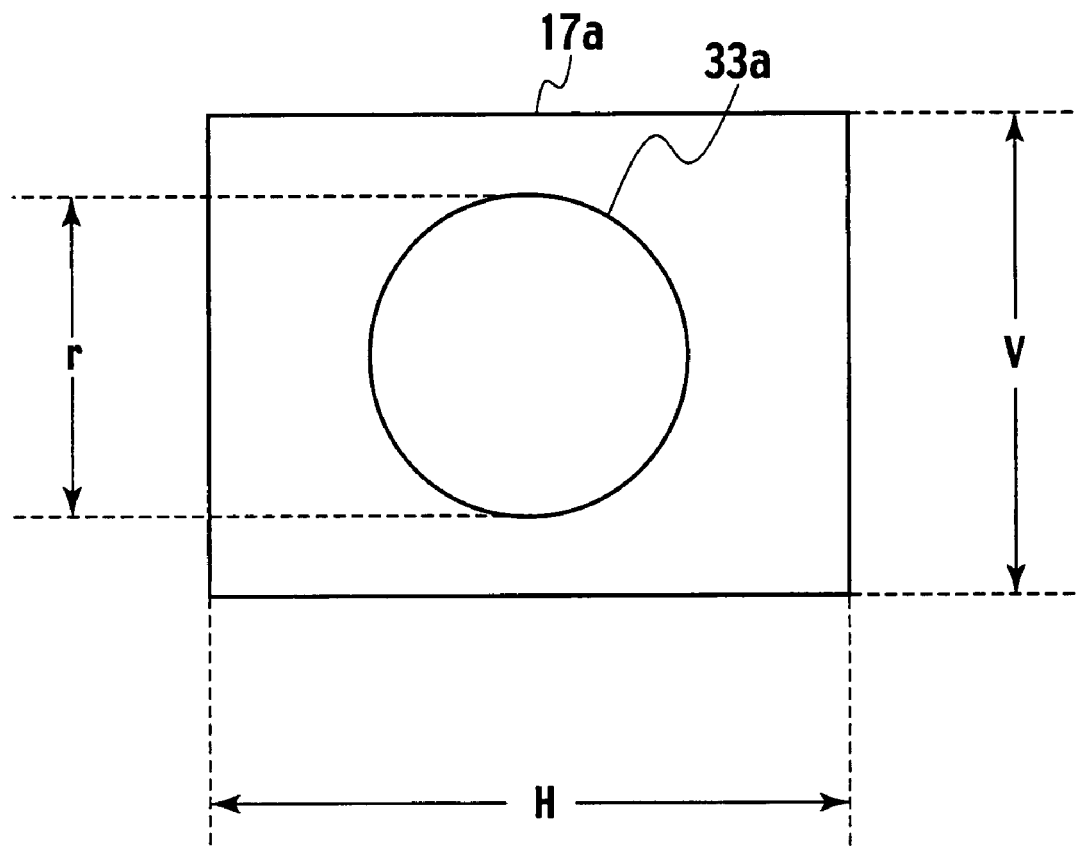
FIG. 4 is a schematic diagram illustrating an image formed on a light receiving face of an imaging device.

FIG. 4 is a schematic diagram illustrating the concept of an image formed on the light receiving face 17a of the imaging device 17. As shown in FIG. 4, the horizontal length of the light receiving face 17a is defined as "H", the vertical length is defined as "V", an image of the light emitting object 33 is defined as "33a", and the diameter of the image 33a is defined as "r".

Then, an angle β can be calculated based on the diameter "r" of the image 33a and the imaging length d.

Figure 5:
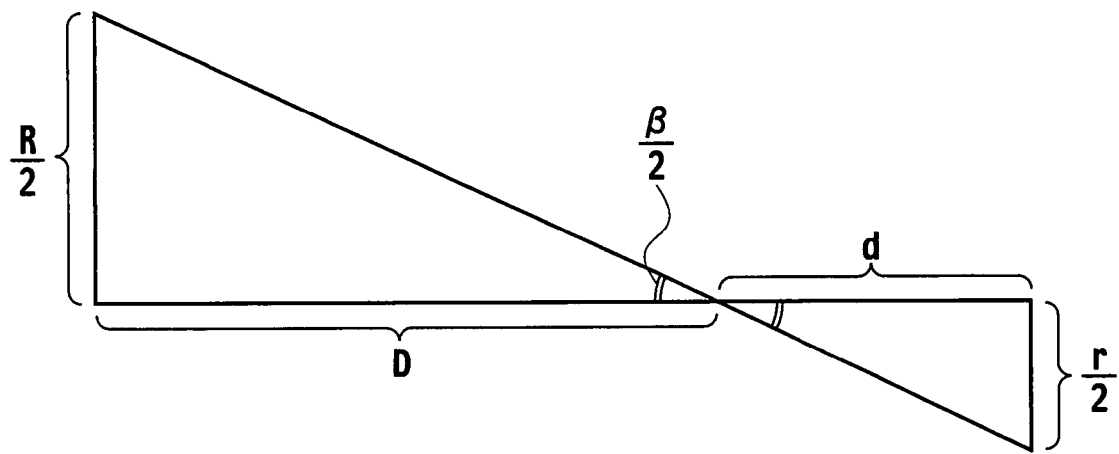
FIG. 5 is a conceptual diagram for calculating a distance to an object.

FIG. 5 is a conceptual diagram illustrating the calculation of the distance D. As shown in FIG. 5, with regards to an image formation position of the photographing lens included in the optical system 16, a scaling relation is established between a triangle formed by the angle β, the distance D, and the R/2 and a triangle formed by the angle β, the distance d, and r/2. Thus, based on this relationship, a trigonometric function formula can be used to measure the distance D based on the following formulae (1) and (2), $$D=(R/2)/\{(\tan(\beta/2)) \tag{1}$$

$$\beta=r/2d \tag{2}$$

Figure 6:
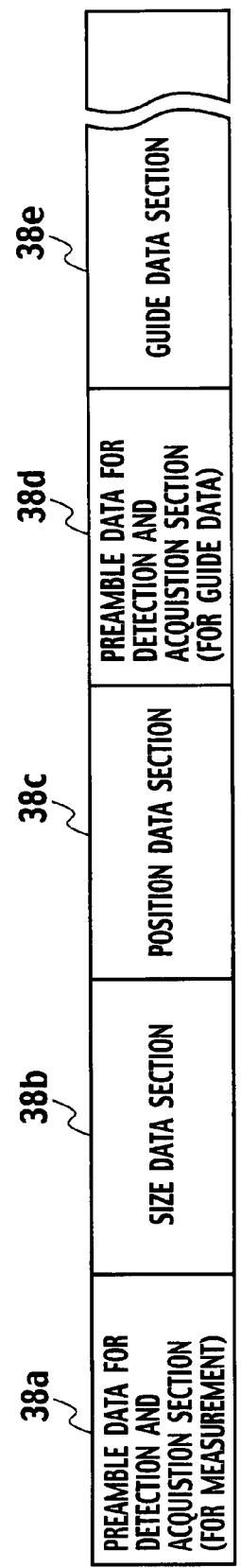
FIG. 6 shows an example of a format of data that is outputted from a controller to a light source and that is transmitted as light.

FIG. 6 shows an example of a format of data that is outputted from the control section 363 to the light source 34 and that is transmitted as the light P. The data format 38 consists of a preamble data section for detection and acquisition section (for measurement) 38a, a size data section 38b, a position data section 38c, a preamble data for detection and acquisition section (for guide data) 38d, and a guide data section 38e. Data is outputted in a cyclic manner based on the data format 38 as a section.

Data stored in the preamble data for detection and acquisition section (for measurement) 38a is data that is detected when the imaging apparatus 10 sets the measurement mode when the imaging apparatus 10 receives the above data format 38. When this data section is received, a distance to the light emitting object 33 or the position thereof is calculated by a predetermined processing operation.

Among data stored in the size data memory, such data is stored in the size data section 38b such as data showing the shape of the luminance window 37 ("circular shape" in this case) and the size data "R" for the luminance window 37. Based on these pieces of data, the imaging apparatus 10 measures the distance to the light emitting object 33.

Among data stored in the self size data memory 352, such data is stored in the position data section 38c such as data showing a position of the light emitting object 33 (e.g., latitude, longitude, altitude). Based on this data, the imaging apparatus 10 measures the direction of the light emitting object 33 seen from the imaging apparatus 10 and the self position.

Data stored in the preamble data for detection and acquisition section (for guide data) 38d is data that is detected when the imaging apparatus 10 sets the guide mode when the imaging apparatus 10 receives the above data format 38. When this data section is received, a processing operation is executed in which the data set in the guide data section 38e is demodulated, reproduced, and outputted.

Data stored in the guide data section 38e is data stored in the guide data memory 351. Based on this data, the imaging apparatus 10 performs optional processing such as a route guide, a sightseeing guide, and auxiliary information related to an imaging operation.

Figure 7:
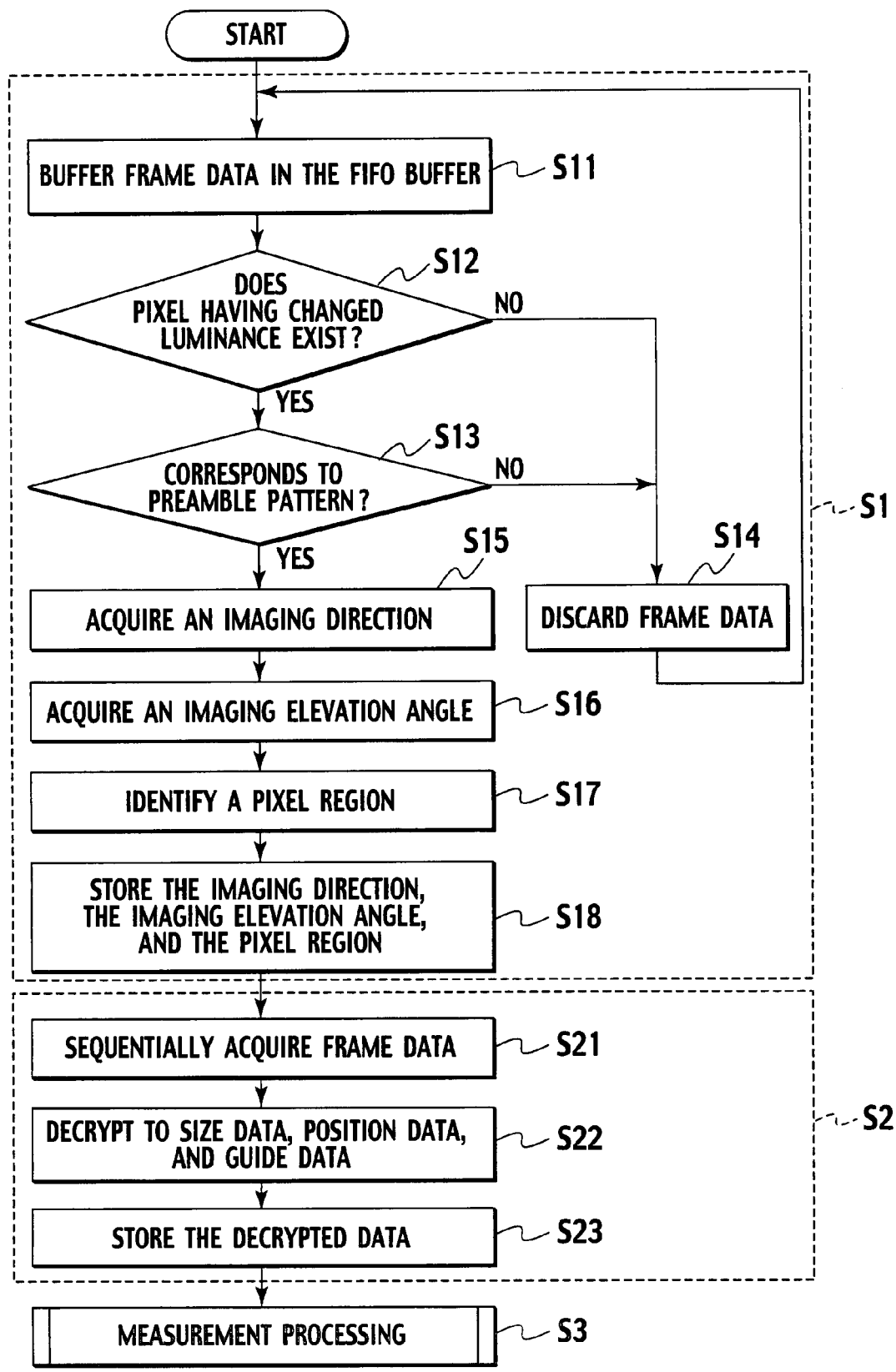
FIG. 7 is a flowchart illustrating the flow of a processing for calculating a distance to an object.

FIG. 7 is a flowchart illustrating the flow of a processing for calculating a distance to an object. This flowchart is mainly composed of a signal region detection processing block S1, a signal demodulation processing block S2, and a measurement processing block S3.

First, the signal region detection processing block S1 firstly uses an image formed in the imaging face (light receiving face 17a) of the imaging device 17 as frame data to allow the main control section 14 to sequentially buffer the number of frames corresponding to the bit count of the buffer preamble pattern in the FIFO buffer 22 (Step S11). Then, the main control section 14 determines whether the plurality of pieces of buffered frame data include a pixel for which the luminance is changed. In particular, the main control section 14 determines whether the plurality of pieces of buffered frame data include a pixel for which the maximum luminance exceeds a predetermined peak and a periodic change is caused or not to determine, based on the pixel, whether data exists for which the luminance is modulated in a time-series manner or not (Step S12).

When the main control section 14 cannot detect a pixel for which the luminance is changed, the main control section 14 performs a processing of Step S14 (which will be described later) to return to Step S11. When the main control section 14 detects a pixel for which the luminance is changed on the other hand, the main control section 14 reads preamble pattern data (for measurement) and preamble pattern data (for guide data) from the pattern data memory 14a to verify these preamble patterns with the above detected time-series luminance change of the pixel (Step S13). When the verification shows that none of the pieces of preamble pattern data correspond to the above detected time-series luminance change, the main control section 14 determines that data cannot be obtained from this detected pixel to discard the frame data buffered in the FIFO buffer 22 (Step S14) to return to the processing of Step S11 again. When the verification shows that any of the pieces of preamble pattern corresponds to the above detected time-series luminance change (including partial match), the main control section 14 drives the orientation sensor 31 to acquire the imaging direction (Step S15) and drives the elevation angle sensor 32 to acquire the imaging elevation angle (horizontal angle) γ (Step S16).

When Step S13 shows that any of the pieces of preamble pattern corresponds to the above detected time-series luminance change, the main control section 14 determines that this detected pixel is a pixel transmitting the data to control the signal region detection unit 14b to identify a pixel region consisting of a pixel group for which the luminance is changed with an identical timing (Step S17). Then, the imaging direction acquired in the Step S15 and the imaging elevation angle elevation of image capturing acquired in the Step S16 are once retained in the RAM 13 in the main control section 14. With regards to the identified image region, the image is stored in the work memory 14d of the signal region detection unit 14b (Step S18).

Next, the signal demodulation processing block S2 will be described. In the signal demodulation processing, the main control section 14 firstly acquires frame data corresponding to a bit count of the data format 38 in a sequential manner from the pixel region identified in Step S17 of the signal region detection processing block S1 (Step S21) to store the frame data in the FIFO buffer 22. The main control section 14 also allows the signal demodulation section 14c to perform a processing for converting the region having the changed luminance to bit data of "1" and "0", the verification of bit data obtained through this processing with the first pattern sequence SA and the second pattern sequence SB, a bit output processing, and a processing for demodulating this outputted bit to size data, position data, and guide data (Step S22). Then, among these pieces of demodulated data, size data and position data are once memorized in the RAM 13 of the main control section 14 and guide data is stored in the data record of the detection data list storage section 13e (Step S23).

Next, the measurement processing block S3 will be described in detail.

FIG. 8 is a flowchart showing the flow of the processing of the measurement processing block S3.

The measurement processing block S3 firstly allows the main control section 14 to read the image of the pixel region stored in the work memory 14d to identify, with regards to this pixel region, the shape of the light emitting object 33 to set a measurement axis (Step S31). Next, the main control section 14 performs a weighting of the respective pixels on this measurement axis to determine an area of the "image" of the light emitting object included in the pixel region (Step S32).

Specifically, a method for determining the measurement axis, the weighting, and the area of the "image" will be described.

Figure 9A:
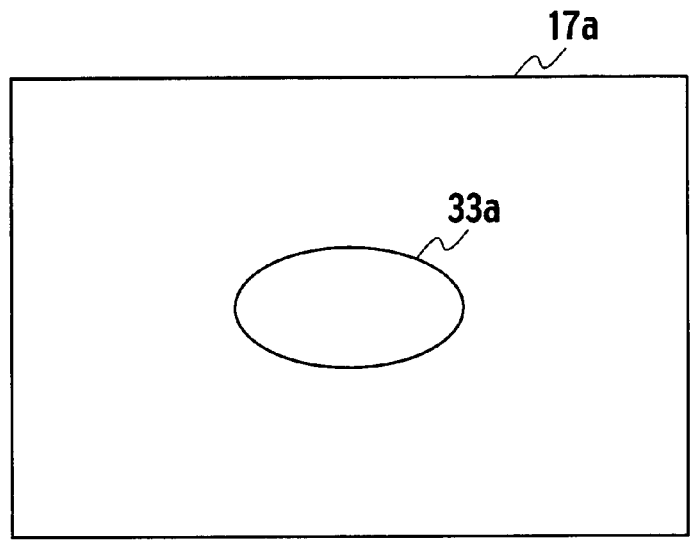
FIGS. 9A and 9B are diagrams for explaining a method for determining the measurement axis, the weighting, and the area of an image.
Figure 9B:
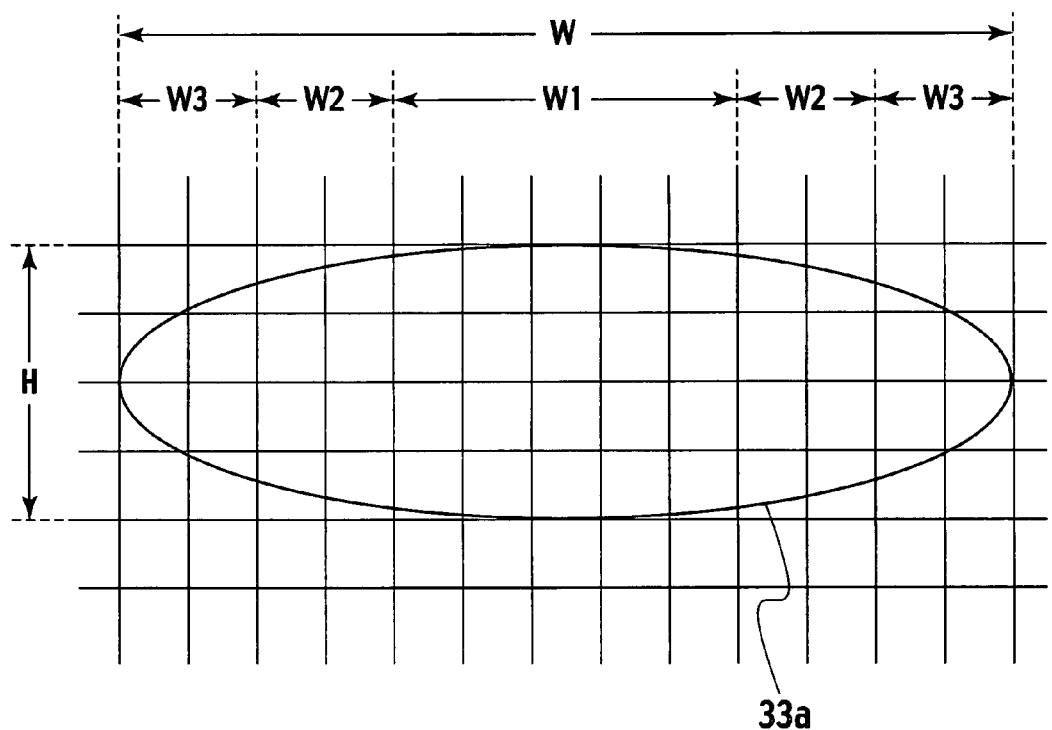

FIGS. 9A and 9B are diagrams for specifically explaining the method for determining the measurement axis, the weighting, and the area of the "image". In FIG. 9A, it is assumed that the frame data sequentially obtained from the imaging face (light receiving face 17a) has the maximum luminance exceeding a predetermined peak and that the image 33a of the light emitting object 33 is set as a candidate of a pixel region having a periodic change. FIGS. 9A and 9B show the image 33a having an elliptical shape because the light emitting object 33 is seen in an oblique direction of 45 degrees from the upper side or the lower side. When the light emitting object 33 is seen from the front side, the light emitting object 33 is seen as the image 33a having a circular shape.

In the expanded view of FIG. 9B, the main control section 14 determines, with regards to the image 33a having a height H (9 dot) and a width W (5 dot), the longest column including many pixels having the maximum luminance peak among one row or one column of dots for which the maximum luminance exceeds a predetermined peak as a measurement axis. Then, the main control section 14 subjects pixels surrounding this measurement axis to a weighting corresponding to the luminance. In FIG. 9B, the main control section 14 sets the maximum weight value "1" to a pixel range W1 having the highest luminance, a weight value "0.6" is set to the peripheral range W2, and a weight value "0.3" is set to the outermost edge range W3 to set the height H (9 dot) as a measurement axis for example. Based on these weighting calculations, the main control section 14 obtains the pixel range W1 of "20", the pixel range W2 of 7.2, and the pixel range W3 of 2.4 to obtain an area of "image" 33a of 29.6.

A method for determining a measurement axis and a weighting and an area calculation method are not limited to the above ones. Any other methods also can be used so long as they can determine an area accurately.

When the area of the "image" of the light emitting object is determined as described above, the main control section 14 reads, with regards to the shape of this image, the distortion correction data based on the characteristic of the imaging lens included in the optical system 16 from the image formation distortion correction data storage section 13b to use the data to correct the distortion (Step S33). The main control section 14 reads the imaging length d from the imaging length data storage section 13a to calculate a value of "β" based on the measurement axis and the imaging length d (Step S34).

When Step S35 calculates the value of "β", the main control section 14 uses this β to read the formula (1) from the distance calculation data table storage section 13c to calculate the distance D in FIG. 5 based on the size data memorized in the RAM 13 of the main control section 14 (Step S35). Since the shape of "image" 33a is set as "elliptical shape" obtained when the circular shape is seen in about 45° direction, the size data obtained by Step S24 as the "circular shape having a diameter R" is corrected, based on the above set shape, to an "elliptical shape having a diagonal √2 L". Then, the main control section 14 uses, based on this distance D and the photographing elevation angle γ calculated by Step S31, the following formula (3) to calculate the distance D' (horizontal direction distance) to a position just below the light emitting object 33 (Step S36).

$$D' = D \cos \gamma \quad (3)$$

The main control section 14 calculates, based on the above calculated distance D', the photographing direction of the imaging apparatus 10 acquired by the orientation sensor 31, and the position data acquired by Step S24, the position of the imaging apparatus 10 (Step S37) to cause these pieces of distance data D' and position data to be memorized in the data record of the detection data list storage section 13e (Step S38).

Figure 10A:
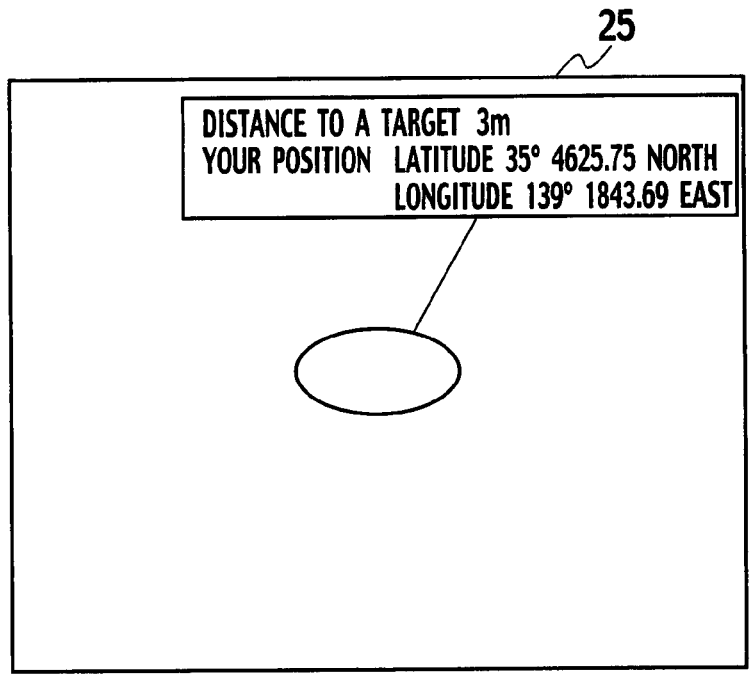
FIGS. 10A and 10B are a diagram illustrating an example of the use of registered data.
Figure 10B:
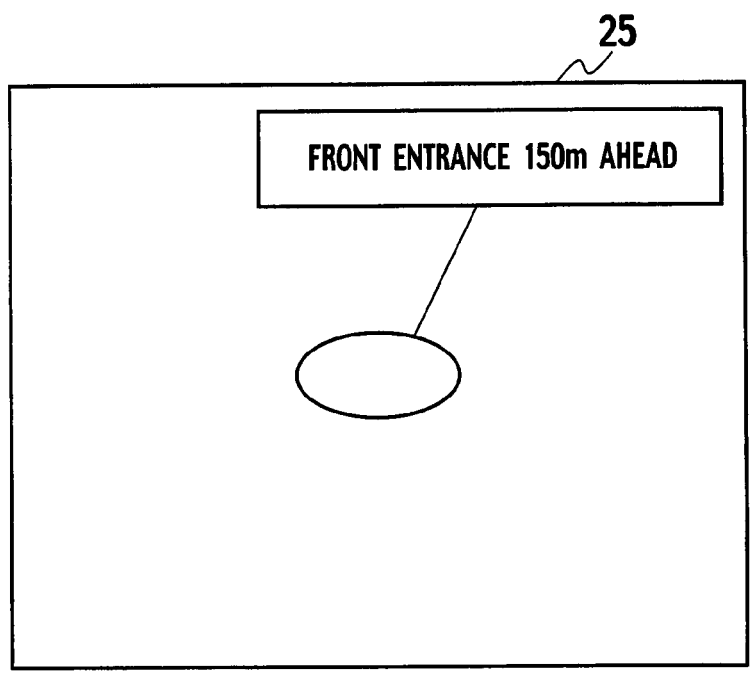

The data registered in this manner can be used by the imaging apparatus 10 in the manner as described below. FIGS. 10A and 10B are a conceptual diagram illustrating an example of the use of registered data. FIG. 10A shows an example of a display when the imaging apparatus 10 is in a measurement mode. FIG. 10B shows an example of a display when the imaging apparatus 10 is in a guide mode. In FIG. 10A, the screen of the display section 25 shows information for a distance to the light emitting object 33 (e.g., "distance to target: 3 m") and information for the current position of the imaging apparatus 10 (e.g., "your position: latitude 35° 4625.75 north and longitude 139° 1843.69 east") displayed while being surrounded by a speech bubble at a screen corner. In FIG. 10B, the screen of display section 25 displays predetermined guide information (e.g., "front entrance 150 m ahead") sent from the light emitting object 33 that is surrounded by a speech bubble at a screen corner.

As described above, the combination of the imaging apparatus 10 and the light emitting object 33 of this embodiment can be used to provide a measured distance, a current position, or a route guide for example by the transmission of information by luminance-modulated light from the light emitting object 33. The distance measurement technique based on the principle as described above can be provided so that imaging operation-related processings and an information display mode are controlled in application examples listed in below Application Example 1

FIG. 11 is a conceptual diagram illustrating an application example of a system consisting of an advertisement exhibit and an imaging apparatus. FIG. 11 shows two persons A and B. These persons A and B carry the above-described imaging apparatuses 10 and read the advertisement exhibit by holding the imaging apparatus 10 to be opposed to the advertisement exhibit 39 provided at a predetermined place. When assuming that a distance from the advertisement exhibit 39 to the person A is D1 and a distance from the advertisement exhibit 39 to the person B is D2, D1<D2 is established. Specifically, the person A is at a position at which the person A can read information printed on the advertisement exhibit 39 while the person B is at a position at which the person B cannot read the above printed information. Although FIG. 11 shows only two persons A and B, the person A also may be interpreted as typically representing people who can at a position having a distance at which the information printed on the advertisement exhibit 39 can be read and the person B may be interpreted as typically representing people who can be at a position having a distance at which the information printed on the advertisement exhibit 39 cannot be read.

The advertisement exhibit 39 shows predetermined advertisement information. In the shown example, this advertisement information shows a printed image of an article (personal computer) and the description thereof and also shows a message of "coupons are distributed!".

This advertisement exhibit 39 is irradiated by illuminating light 40a of visible light from a lamp 40. This irradiation range corresponds to the light source for visible the light communication of the light emitting object 33 as described above. Hereinafter, this irradiation range will be referred to as light emitting object 40b for convenience and for consistency with the above description.

The main function of the lamp 40 is to use the illuminating light 40a to brightly illuminate the advertisement exhibit 39 so that more people can notice the advertisement exhibit 39. The second function of the lamp 40 is to change the luminance of the illuminating light 40a with a short time interval that cannot be recognized by human eyes so that desired data can be transmitted through visible light communication based on the luminance change pattern of the light emitting object 40b (reflected light from the illuminating light 40a).

The display section 25 of the imaging apparatus 10 held by the person A existing close to the advertisement exhibit 39 displays, as shown by the reference numeral 41, an imaged image 42 showing a large image of the advertisement exhibit and an information frame 43. This information frame 43 displays therein a message of "attached information (discount coupon) was received and stored". Although a discount coupon is shown in this example, this is a mere example. Any sales promotion information may be displayed such as information for a link on the Internet (e.g., URL information) for providing a special service.

On the other hand, the display section 25 of the imaging apparatus 10 held by the person B existing away from the advertisement exhibit 39 displays, as shown by the reference numeral 44 in FIG. 11, an imaged image 45 showing a small image of the advertisement exhibit corresponding to the distance from the advertisement exhibit 39 to the person B and an information frame 46. This information frame 46 displays therein, as auxiliary information regarding an imaging of this advertisement exhibit 39, a message of "Attached information (discount coupon) is distributed. However, your position is too far away and thus the information cannot be acquired. Please move closer to a position within 30 m from the advertisement".

Then, when the person holding the imaging apparatus 10 sees the imaged image 45 displayed on the display section 25 and can read the information printed on the advertisement exhibit 39, the imaging apparatus 10 is allowed to photograph the imaged image to acquire the coupon. When the person holding the imaging apparatus 10 cannot read the above information on the other hand, this person can be guided to a position closer to the advertisement exhibit 39. Although this example shows the advertisement exhibit 39, the present invention is not limited to this. Any other exhibition media used for advertisement or the like can be used such as a street poster or a display. An exhibition medium is not always required to provide visible information and also may provide only information by visible light communication.

Although the illuminating light 40a from the lamp 40 is reflected from the advertisement exhibit 39 in this example, other visible light communication styles also may be used. For example, a backlight-type display panel, a large backlight display, or a self-luminous display such as LED also may be used. In other words, any visible light communication may be used so long as the communication can finally provide a modulation signal to the imaging apparatus 10.

Figure 12:
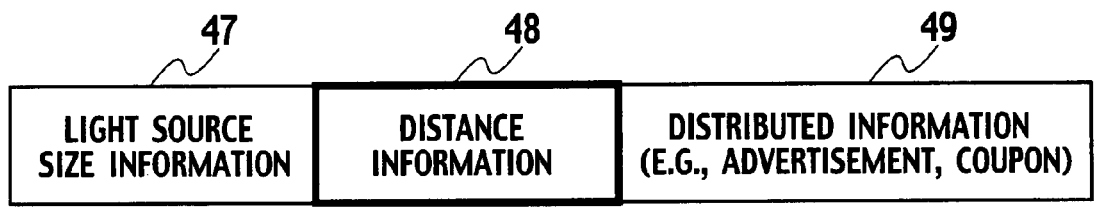
FIG. 12 illustrates an example of information sent from the light source.

FIG. 12 illustrates information sent from the light source (lamp 40). In FIG. 12, information sent from the light source (lamp 40) includes a light source size information storage section 47, a distance storage section 48, and a distributed information storage section 49. The light source size information represents a floodlighting size of the illuminating light 40a irradiated from the light source (lamp 40) to the advertisement exhibit 39 and corresponds to the size data 38b of FIG. 6 in the above description for the principle. This light source size information is given as an initial value when the lamp 40 is placed. Distance information stored in the above distance storage section 48 is determined for every piece of distributed information. The above distance information is information including the maximum distance at which a person holding the imaging apparatus 10 can read information printed on the advertisement exhibit 39. This distance information is updated when the advertisement exhibit 39 is exchanged with a new one or when the advertisement exhibit 39 is repainted.

The preamble for detection and acquisition included in the data format (see FIG. 6) is a format required for a preamble data body. However, various signal detection and acquisition methods may be used as described above such as a method for dispersing bit 0/1 to the first pattern sequence SA and the second pattern sequence SB to modulate a light source. A data format of a data protocol layer used in the present invention has no relation with the essential of the present invention. Thus, a protocol component for detecting or complementing a signal (e.g., preamble) will not be shown or described.

Figure 13:
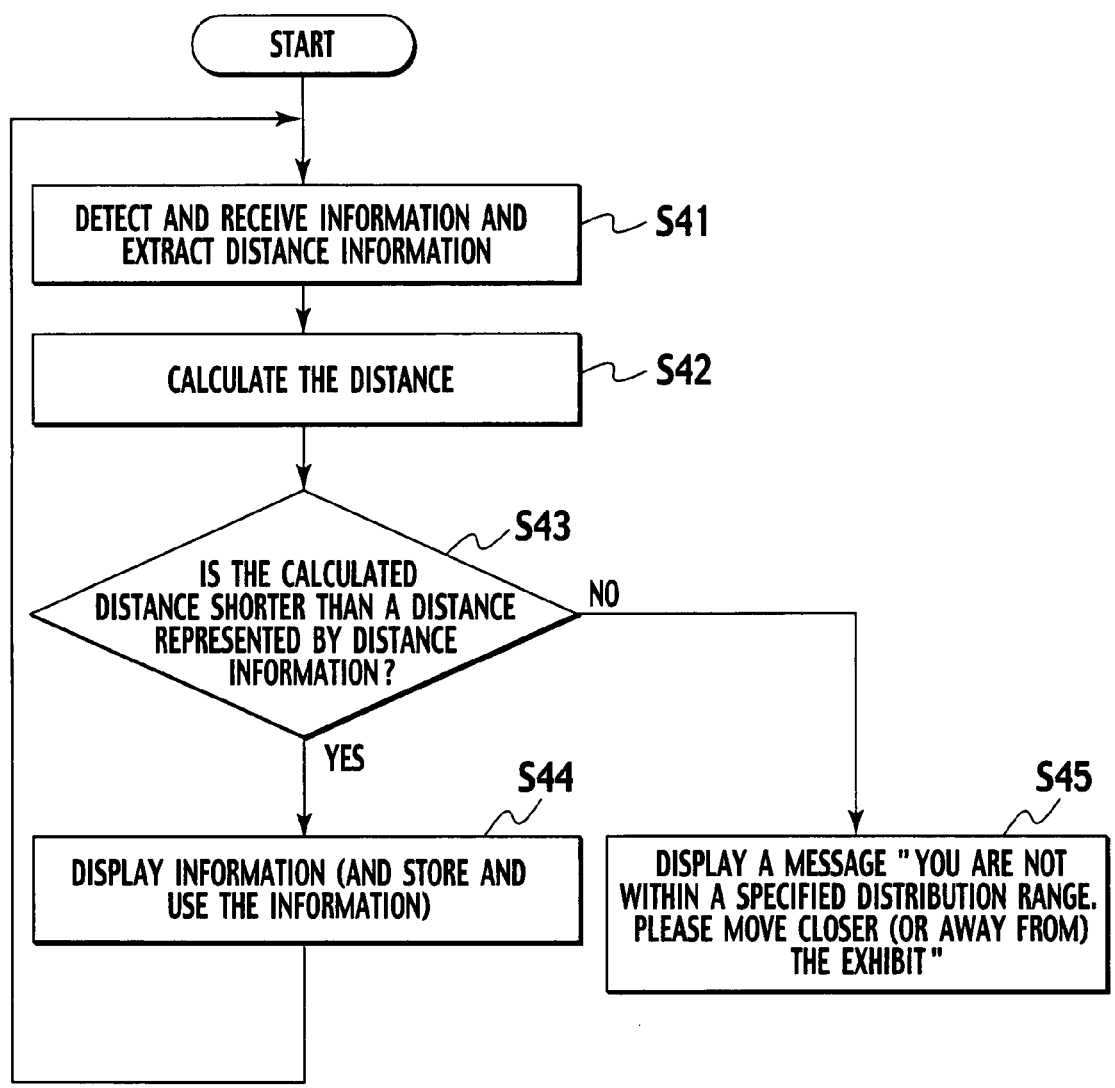
FIG. 13 shows a flow of a processing in an application example of a system consisting of the advertisement exhibit and the imaging apparatus.

FIG. 13 shows a flow of a processing in an application example of a system consisting of the advertisement exhibit 39 and the imaging apparatus 10. In FIG. 13, when the imaging apparatus 10 detects and receives information sent from the light 40a of the lamp 40 (see FIG. 13), the imaging apparatus 10 firstly extracts distance information (information stored in the distance storage section 48) from the information (Step S41) to calculate a distance to the information transmission position (the illuminating light 40a on the advertisement exhibit 39) (Step S42). This distance calculation is performed by the method as descried above.

Next, the imaging apparatus 10 determines whether the above calculated distance is shorter than a distance represented by the distance information or not (Step S43). When the above calculated distance is shorter than a distance represented by the distance information, information for permitting acquisition of the coupon is displayed (and stored and used) for example as shown by the reference numeral 41 of FIG. 11 (Step S44). When the above calculated distance is longer than a distance represented by the distance information on the other hand, information as shown by the reference numeral 44 of FIG. 11 is displayed that does not permit acquisition of the coupon and information asking the person to move closer to the advertisement exhibit 39 is displayed for example (Step S45).

As described above, according to the application example of this special advertisement, distance information in information sent from the light source (lamp 40) can be referred in one processing in the entire imaging process to determine the display or operation of the imaging apparatus 10. Thus, information is transmitted through irradiation light (indirect light) for which the luminance is modulated through the exhibition medium (advertisement exhibit 39) so that the information includes conditions regarding acquisition of the information printed on the advertisement exhibit 39 (distance information). Thus, the information can be provided in a very fine manner by which coupon information for example is distributed only to a person who can read the above printed information.

The application example of this advertisement exhibit can show "types of information that can be acquired" and "a distance required for the person to move closer to obtain the coupon". Thus, the person can be guided to obtain the information to allow the person to read detailed advertisement. Thus, an enhanced advertising effect can be expected.

Although the above example has described a case in which the person cannot acquire information when a distance between the advertisement exhibit and the person is too long and the person is guided to move closer to the advertisement exhibit, an opposite rule also may be used in which the person cannot acquire information when a distance between the advertisement exhibit and the person is too short and the person is guided to move away from the advertisement exhibit. This opposite rule can be used when a specific photographic subject such as a new product is desirably prevented from being photographed at a short distance at which the details can be seen or when a copyright or portrait rights should be protected.

It is noted that the above distance information also may include an upper limit distance and a lower limit distance.

Figures 14A, 14B:
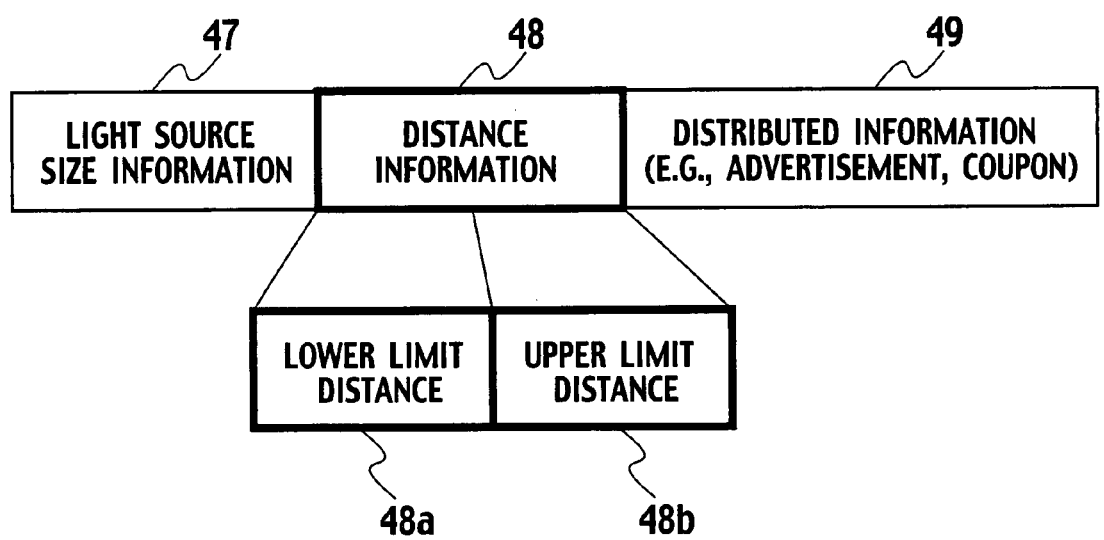
FIGS. 14A and 14B illustrate information including an upper limit distance and a lower limit distance.

FIGS. 14A and 14B illustrate information including an upper limit distance and a lower limit distance. FIG. 14A shows the structure thereof. FIG. 14B shows an example of stored information. The structures of FIGS. 14A and 14B are different from that of FIG. 12 in that the distance storage section 48 includes a lower limit distance storage section 48a and an upper limit distance storage section 48b. When the lower limit distance storage section 48a is set to "0" (hereinafter section: "m") and the upper limit distance storage section 48b is set to "20" for example, this means a range within 20 m. When the lower limit distance storage section 48a is set to "10" and the upper limit distance storage section 48b is set to "0" on the other hand, this means a range of 10 m or more. Similarly, the lower limit distance storage section 48a set to "5" and the upper limit distance storage section 48b set to "30" mean a distribution distance range from 5 m to 30 m. The upper limit and the lower limit both set to "0" mean no limitation in distance.

Alternatively, distance information and distance conditions also may be set to control various operations related to a photographing operation such as an execution, storage, editing, and transmission (e.g., permission or prohibition of an execution of a photographing operation). For example, the photographic subject side can control the photographing operation by specifying, in order to protect the copyright or portrait rights, a condition of "prohibition of photographing of the photographic at a short distance to the subject" or an opposite condition of "permission of photographing of a person as a photographic subject at a distance at which the appearance of the person is most attractive".

Figure 15:
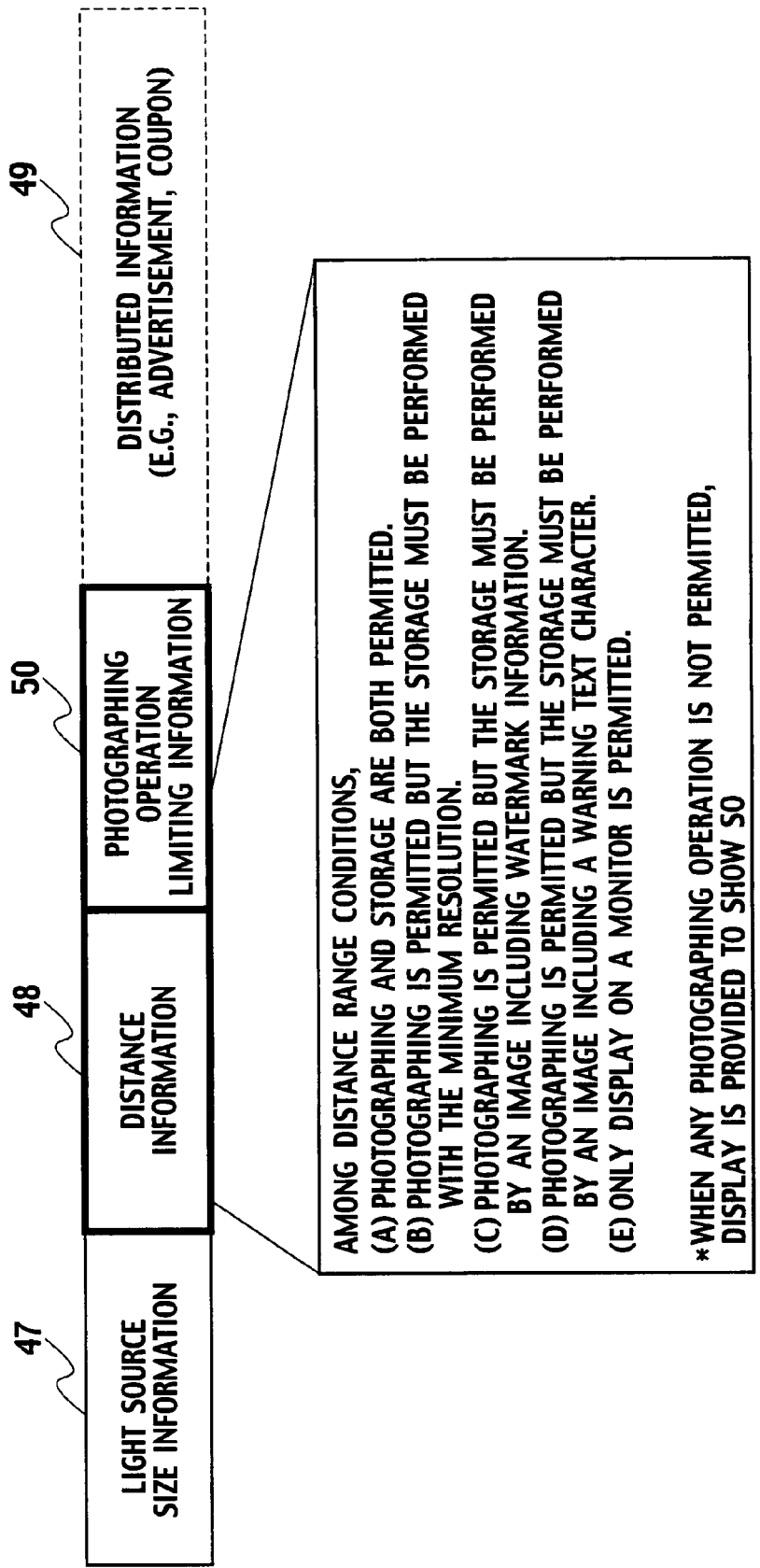
FIG. 15 shows an example of a sending format corresponding to the permission and prohibition of a photographing operation for example.

FIG. 15 shows an example of a sending format corresponding to the permission and prohibition of a photographing operation for example. As shown in FIG. 15, the sending format has the same structure as those of FIG. 12 and FIGS. 14A and 14B (the light source size information storage section 47, distance storage section 48, and distributed information storage section 49) but is different from FIG. 12 and FIGS. 14A and 14B in including a photographing operation limiting information storage section 50. This photographing operation limiting information storage section 50 is set to show, based on a request by the information provider, any of the following permission category classifications of: (A) photographing and storage are both permitted, (B) photographing is permitted but the storage must be performed with the minimum resolution, (C) photographing is permitted but the storage must be performed by an image including watermark information, (D) photographing is permitted but the storage must be performed by an image including a warning text character, or (E) only display on a monitor is permitted for example.

By the manner as described above, photographing-related limitation can be instructed finely only by selecting any of the above permission category classifications of (A) photographing and storage are both permitted, (B) photographing is permitted but the storage must be performed with the minimum resolution, (C) photographing is permitted but the storage must be performed by an image including watermark information, (D) photographing is permitted but the storage must be performed by an image including a warning text character, or (E) only display on a monitor is permitted to set the selected permission category classification to the photographing operation control information storage section 50. Although this embodiment has provided limitation on the display and storage of an image, other limitations also may be additionally used such as limitation on the second use (redistribution) of a photographed image by attaching the image to an e-mail.

Since a photographing operation is always involved with images, photographing-related limitation is desirably provided not only by the above distance conditions but also by information for an angle of view of an optical system (e.g., information for telescopic or wide-angle) because the angle of view information can be always obtained at a stage of the distance measurement or information for image definition.

Application Example 2

Figure 16:
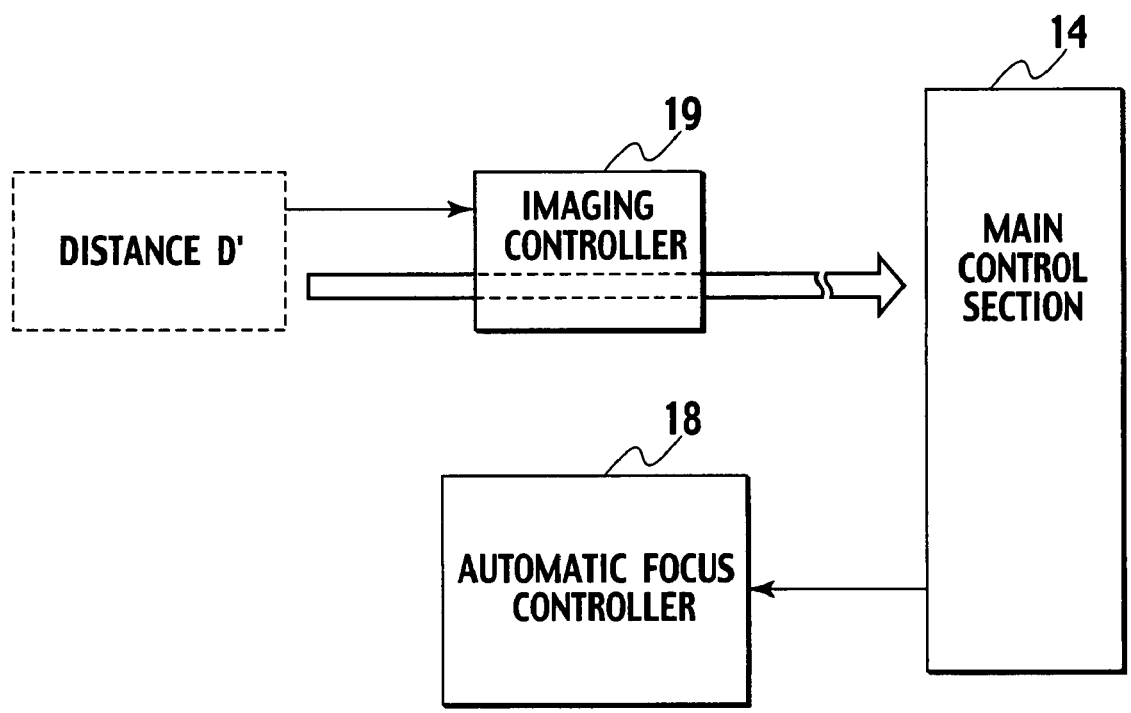
FIG. 16 is a conceptual diagram illustrating when measurement data for a distance to the light emitting object is used for the focusing control of the optical system.

FIG. 16 is a conceptual diagram illustrating when measurement data for a distance to the light emitting object 33 is used for the focusing control of the optical system 16. In FIG. 16, the automatic focus controller 18 is controlled via the imaging controller 19 and the main control section 14 based on the distance D' between the imaging apparatus 10 and the light emitting object 33 calculated based on the principle as described above.

More particularly, when the light emitting object 33 is provided at a position of the photographic subject 20 as a target in FIG. 1 and when the image 33a caused by light emitted from the light emitting object 33 is imaged by the imaging device 17, distance information subjected to luminance modulation sent from the light emitting object 33 can be received through light reception and an area value of the light emitting object 33 for which the light is received can be obtained to obtain a distance between the imaging apparatus 10 and the light emitting object 33. Depending on this distance, the optical system 16 of the imaging apparatus 10 can perform a focusing operation. Thus, a troublesome procedure as required by a conventional focusing operation is eliminated in which an original picture composition is returned while the focus is being locked to subsequently perform a photographing operation. When the present invention is applied to a focusing operation as described above, there is a possibility where focusing is inaccurate during the measurement of a distance to the light emitting object 33. Thus, a photographing lens desirably has the minimum aperture during the measurement.

Figure 17:
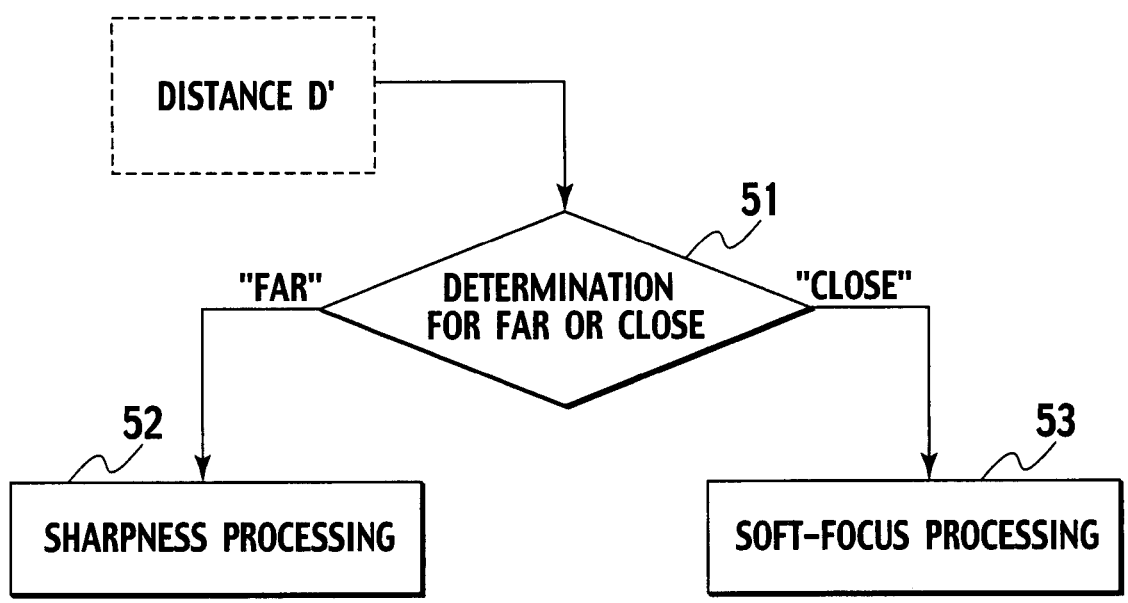
FIG. 17 is a flowchart illustrating a predetermined processing for an image by using a distance to the light emitting object.

FIG. 17 is a flowchart illustrating imaging-related processings for an image imaged by using a distance between the imaging apparatus 10 and the light emitting object 33. In FIG. 17, when the distance D' is acquired, this distance D' is used to determine whether the imaging apparatus 10 is far from or close to the light emitting object 33 (Step S51). When the imaging apparatus 10 is far from the light emitting object 33, the imaged image is subjected to a sharpness processing (Step S52). When the imaging apparatus 10 is close to the light emitting object 33 on the other hand, the imaged image is subjected to a soft-focus processing (Step S53). The term "sharpness processing" herein means a processing for making an image contour clearer and the term "soft-focus processing" on the contrary is a processing for reducing the sharpness of the contour.

In this embodiment, as shown in FIG. 17, an imaged image is subjected to the sharpness processing or the soft-focus processing based on the above distance D'. Thus, the image effect as described above corresponding to general photographing techniques can be obtained without using a special lens or filter for example. This can eliminate a labor hour and allows a beginner to easily use the effective photographing technique to photograph an image having a good appearance.

Application Example 3

Figure 18:
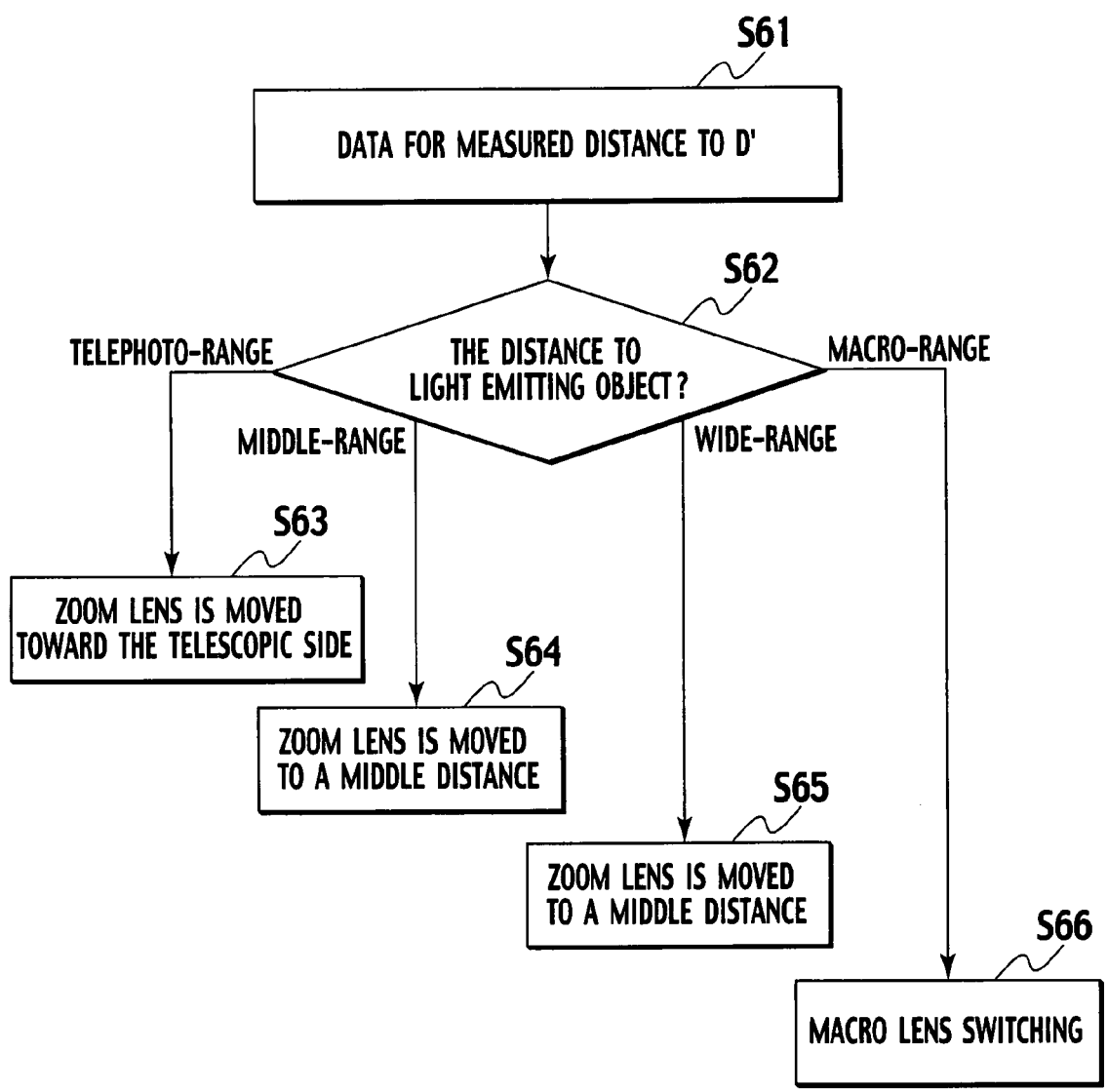
FIG. 18 is a conceptual diagram when data of a distance to the light emitting object is used for the control of photographing conditions.

FIG. 18 is a flowchart illustrating imaging-related processings for controlling, depending on a distance from the imaging apparatus 10 to the light emitting object 33, photographing conditions (an optical system in particular). In FIG. 18, when the above distance D' is acquired (Step S61), whether the distance between the position of the imaging apparatus 10 and the position of the light emitting object 33 can be classified as being within a predetermined range or not is determined based on this distance D' (Step S62). When the distance therebetween is determined as being in a telephoto-range, then a zoom lens is moved toward the telescopic side (Step S63). When the distance therebetween is determined as being in a middle-range, the zoom lens is moved to a middle distance (middle angle of view) (Step S64). When the distance therebetween is determined as being in a wide-range, the zoom lens is moved to the wide angle side (Step S65). When the distance therebetween is determined as being in a macro-range, a macro lens having the shortest photographing distance from the zoom lens is newly used (Step S66). Thus, the angle of view and the photographing distance of the photographing lens can be controlled depending on the distance to the light emitting object 33 and an operator is prevented from having to perform operations to change a multiplication factor of a zoom lens and to switch the current lens to a macro lens, thus providing convenience to users.

Application Example 4

Figure 19:
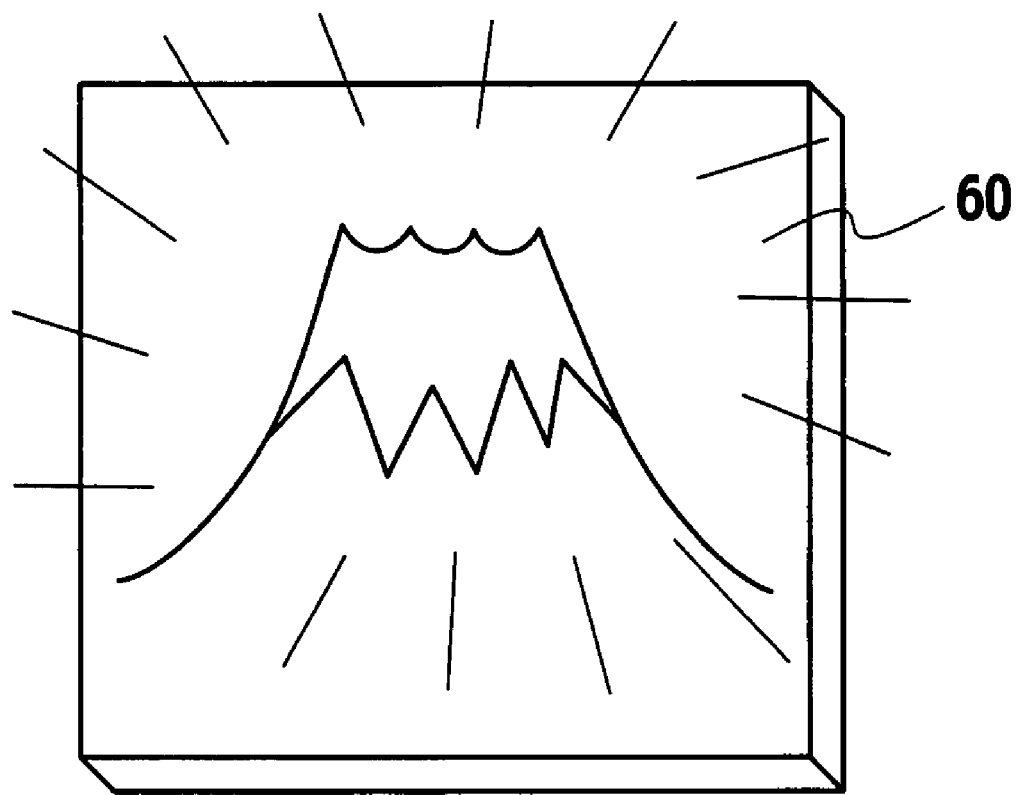
FIG. 19 illustrates a billboard as a visible light information light source corresponding to a light emitting object.

FIG. 19 illustrates a billboard 60 corresponding to the light emitting object 33 in the above description of the principle. In FIG. 19, this billboard 60 is placed at a roof of a building or at a wall surface for example. The billboard 60 is a large light emitting display having a one side of a few meters in which a great number of LED are arranged in a matrix manner for example.

Figure 20:
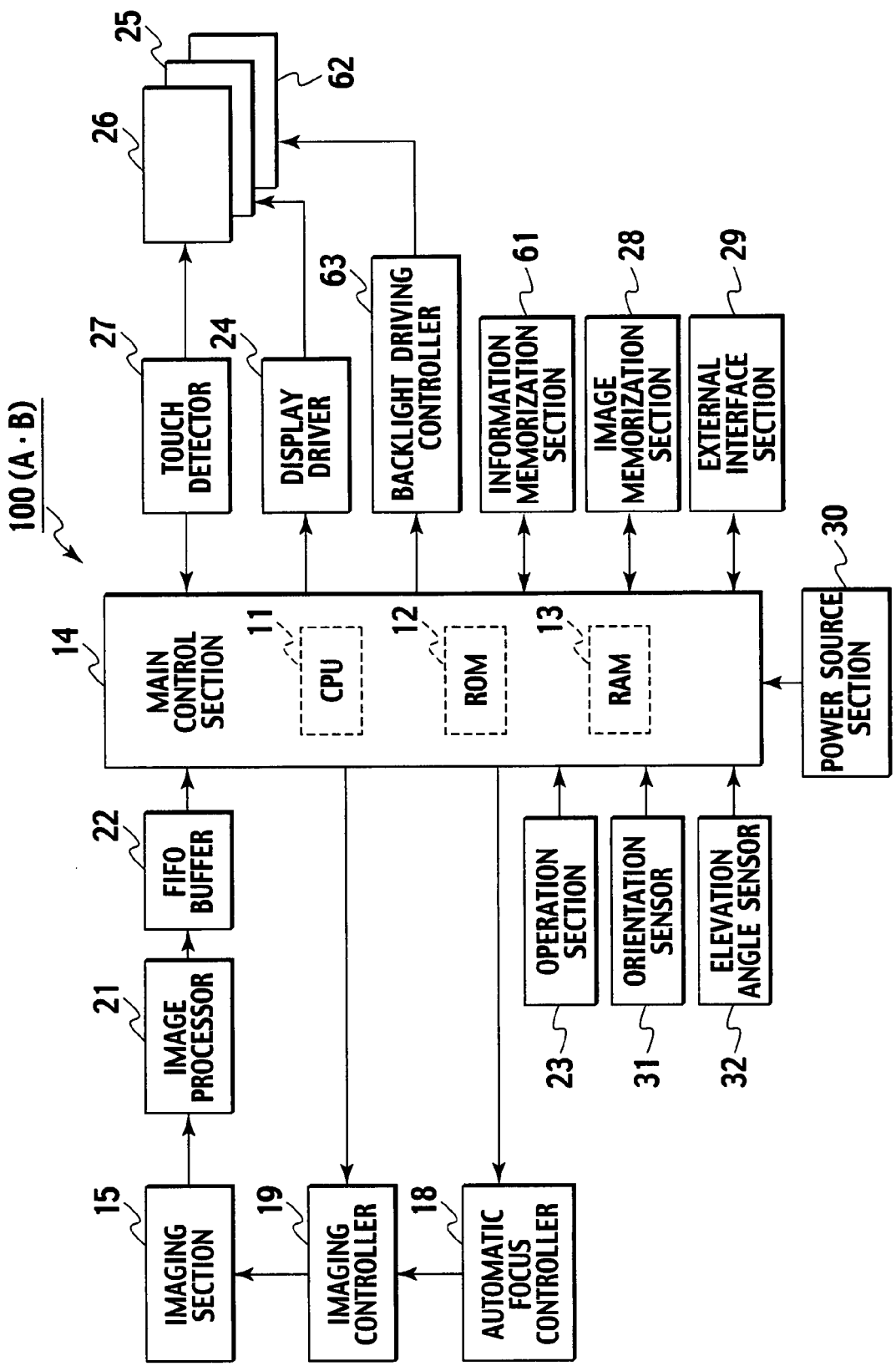
FIG. 20 shows a circuit structure of an imaging apparatus.

FIG. 20 is a circuit diagram illustrating an imaging apparatus 100 corresponding to the imaging apparatus 10 (see FIG. 1) in the above description for the principle. In FIG. 20, circuits having the same functions and operations as those of the circuits of FIG. 1 are denoted with the same reference numerals and will not be described further. The imaging apparatus 100 further includes an information memorization section 61, a backlight 62, and a backlight driving controller 63. An external interface section 29 includes a wireless communication section to send and receive contents memorized in the image memorization section 28 and the information memorization section 61. A CPU 11 further includes a function as the luminous control section 36 in FIG. 2.

The information memorization section 61 detects the operation section 23 by a user to store address book data or mail data inputted, prepared, or edited. The information memorization section 61 also stores guide data memory 351 in the data memory 35 in FIG. 2, information corresponding to contents memorized in the self size data memory 352 (the shape or area of the display section 25 in particular), and various pieces of information acquired from an information source (which will be described later). The backlight 62 is a light source consisting of a plurality of LED for irradiating the display section 25 from the back face.

The backlight driving controller 63 has a function to adjust the luminance of the backlight 62 based on a control signal from the main control section 14 (CPU 11) and adjusts the luminance of the backlight 62 based on an operation by a user. When the backlight 62 itself functions as the light emitting object 33, the backlight driving controller 63 receives modulated information read from the information memorization section 40 to change, based on this information, the luminance of the backlight 62 in a time-series manner. Although the application example 4 assumes the display section 25 as a liquid crystal display (transmissive liquid crystal display requiring illumination from the back face in a narrow sense), the display section 25 also may include a light-emitting function such as organic EL material. In this case, a display driver 24 has the function and operation of the backlight driving controller 63.

As described above, the billboard 60 has luminance modulated by arbitrary information and thus can be used as an information source. The imaging apparatus 100A can be used not only as an apparatus for receiving information but also an apparatus that receives information through visible light communication to send the information. Such an information sending apparatus also may be, in addition to the billboard 60, a traffic signal machine, a ceiling light, an interior light, or a street light for example.

Figure 21:
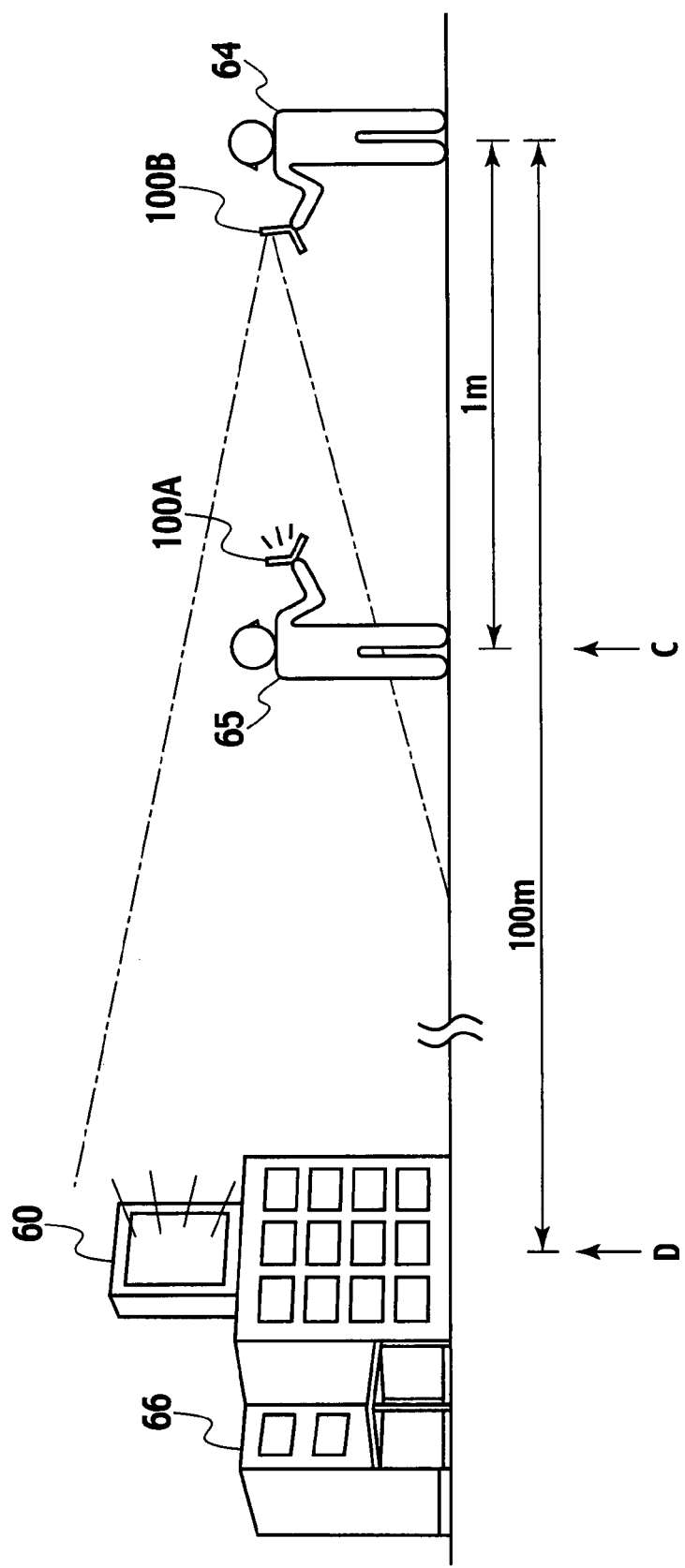
FIG. 21 shows a positional relation between the billboard and the imaging apparatus.

FIG. 21 shows a positional relation among the billboard 60, the imaging apparatus 100A, and the imaging apparatus 100B. In FIG. 21, with regards to the position of the person 64 as a reference point, two information-sending apparatuses (billboard 60 and imaging apparatus 100A) exist at a distance C (e.g., 1 m) and at a distance D (e.g., 100 m). The distance C has a person 65 holding the imaging apparatus 100A and the distance D has the billboard 60 placed at the roof of a building 66.

Figure 22:
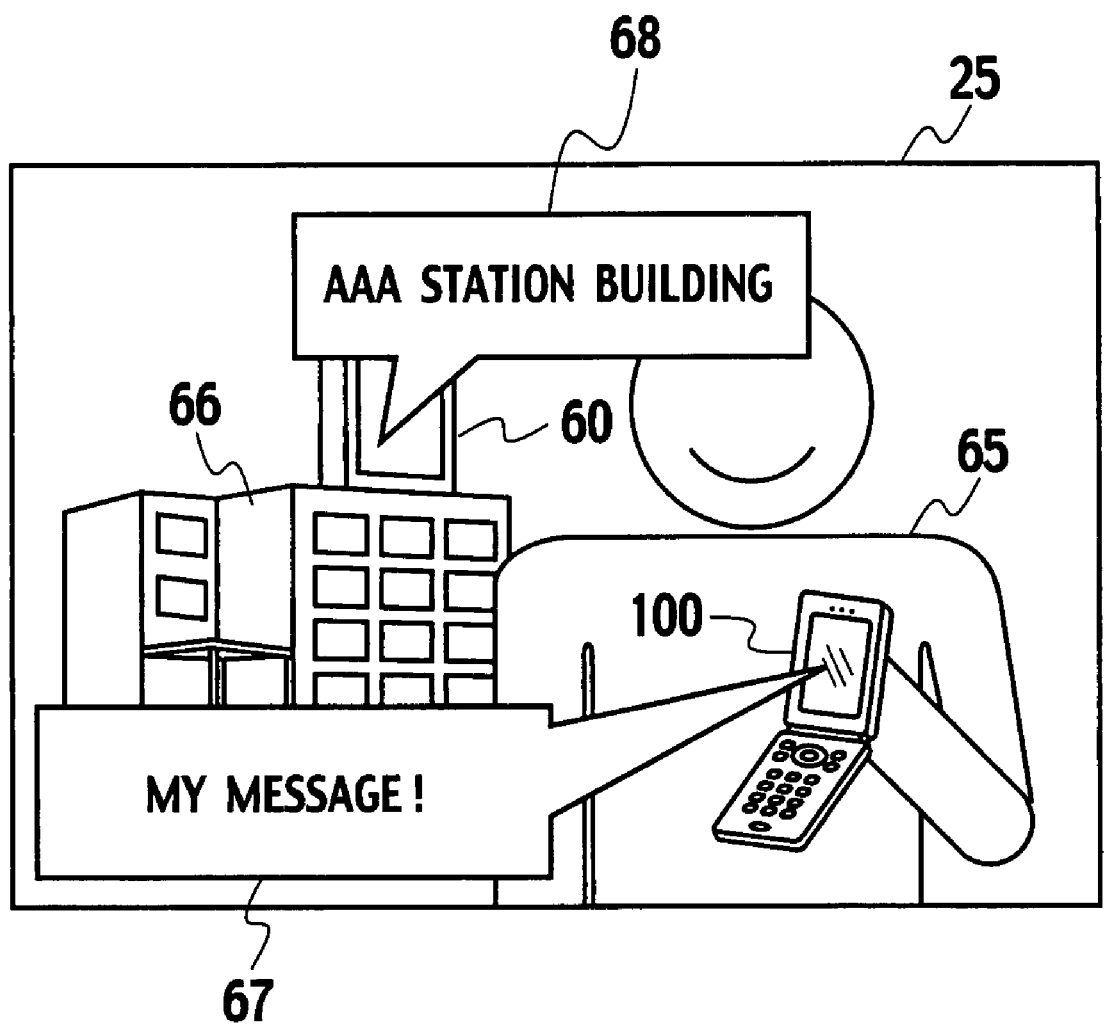
FIG. 22 illustrates an example of a screen display of a display section.

FIG. 22 shows an example of a display by the display section 25 of the imaging apparatus 100B when the present invention is not used. In FIG. 22, the display section 25 displays the person 65 positioned at the distance C, the imaging apparatus 100A held by the person 65, the building 66 positioned at the distance D, and the image on the billboard 60 provided at the roof of the building 66. The display section 25 displays information sent from the billboard 60 and the imaging apparatus 10A so that the information from the imaging apparatus 100A is displayed as "my message!" in a speech bubble 67 and the information from the billboard 60 is displayed as "AAA station building" in a speech bubble 68 for example.

When the present invention is not applied, the two pieces of information displayed on the display section 25 have an identical display size. Thus, a problem is caused in which an increased number of speech bubbles suppresses a user from visually recognizing the speech bubbles.

Figure 23:
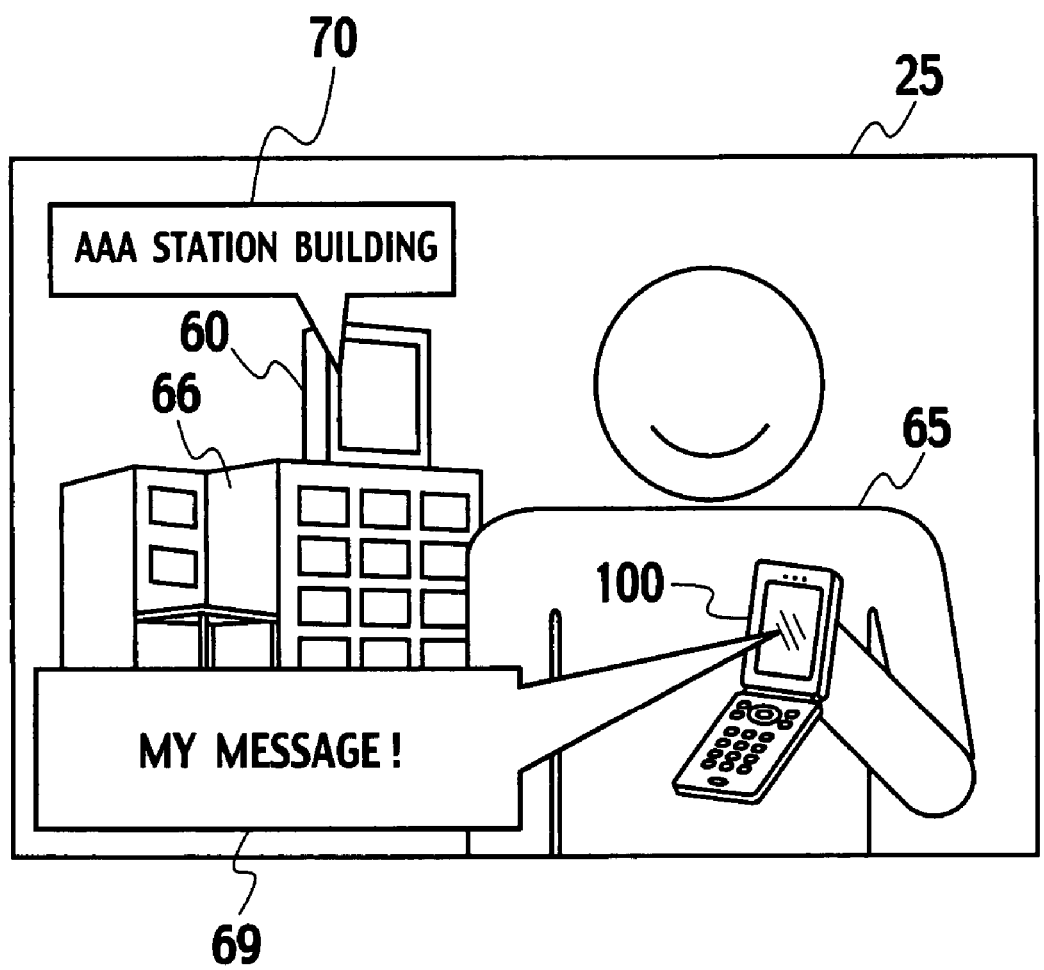
FIG. 23 illustrates an example of an improved screen display of a display section.

FIG. 23 shows an example of a display by the display section 25 of the imaging apparatus 100B when the present invention is used in which a display mode is controlled depending on a distance between the imaging apparatus 100B and an information source. In the shown example, the display section 25 displays an image of the imaging apparatus 100A held by the person positioned at the distance C and an image of the billboard 60 provided at the roof of the building 66 positioned at the distance D and also displays pieces of information sent from the imaging apparatus 100A and the billboard 60 surrounded by the speech bubbles 69 and 70. FIG. 23 is different from FIG. 22 in the following point.

Specifically, the distance C is acquired to display the information from the imaging apparatus 100A positioned at the distance C ("my message!") with characters having a larger size and the distance D larger than the distance C is obtained to display the information from the billboard 60 ("AAA station building") with characters having a smaller size. Thus, this application example can provide the above respective pieces of information with a visual perspective. This application example also can display information having a shorter distance with characters having a larger size so that the information can be conspicuous and can display information having a longer distance with characters having a smaller size so that only the existence thereof can be noticed. This is particularly advantageous because a plurality of pieces of information can be displayed and read in an easier manner. Although this example has provided different information display modes by changing the character size, the invention is not limited to this. Other display modes also may be used by controlling, for example, the color of a character, a character font, or an existence or nonexistence of a border attribute or by controlling the size of a speech bubble of each piece of information, a background color, a color or thickness of a frame border, or the transparency level of a speech bubble. Any display mode may be used so long as information closer to a user can be displayed in a more conspicuous manner because information closer to a user may be useful information.

FIG. 24 shows the flow of a processing for obtaining the above improvement example (FIG. 23). In this processing flow, whether the imaging apparatus 100B has detected information from an information source or not is firstly determined (Step S71). When it is determined that the imaging apparatus 100B has detected information from an information source, the imaging apparatus 100B refers to a received data list (the detection data list storage section 13e of FIG. 3) (Step S72) to extract data having a shorter distance (Step S73). Then, the imaging apparatus 100B determines whether the number of the extracted pieces of data exceeds a predetermined number "n" or not (Step S74). The term predetermined number "n" herein means the maximum number of pieces of information that can be displayed on the display section 25 and n=4 is assumed in this example.

When the number of the extracted pieces of data does not exceed the predetermined number "n", the imaging apparatus 100B determines, as described in the above description for the principle, a bubble size and a size of characters to be displayed in accordance with a distance between the imaging apparatus 100B and the respective information sources (Step S75) to display the respective speech bubbles 69 and 70 in the display section 25 (Step S76). When the number of the extracted pieces of data exceeds the predetermined limitation number "n" on the other hand, the imaging apparatus 100B displays a predetermined marking in the detection data region (Step S77).

Then, the imaging apparatus 100B determines whether reception of all pieces of data is completed or not (Step S78). When the reception of all pieces of data is not completed yet, the processings after Step S72 are repeated. When the reception of all pieces of data is completed, the step of determining whether the imaging apparatus 100B has detected information from an information source or not (Step S71) is returned.

According to this processing flow, the information from the imaging apparatus 100A positioned at the distance C can be displayed with a larger speech bubble and characters having a larger size while the information from the billboard 60 positioned at the distance D away from the distance C can be displayed with a smaller speech bubble and characters having a smaller size.

Thus, the respective pieces of information can be provided with a visual perspective. In addition, information closer to a user can be displayed with characters having a larger size so that the information is conspicuous and information farther away from a user can be displayed with characters having a smaller size so that the information is conspicuous so that only the existence thereof can be noticed by the user. This is particularly advantageous because a plurality of pieces of information can be displayed and read in an easier manner.

Also according to this processing flow, when the number of the extracted pieces of data exceeds the predetermined limitation number "n", the imaging apparatus 100B displays a detection data region having a predetermined marking on the display section 25. Thus, a great amount of information can be displayed in a smooth and organized manner. Specifically, the imaging apparatus 100B can monitor the maximum number of pieces of displayable data (n) to prevent the display section 25 from being filled with all received pieces of information (or images added with texts) in speech bubbles.

Sizes of characters based on the distances thereof may be basically determined so that characters for information having a longer distance are displayed with a smaller size by displaying information within 5 m from a user for example with characters of 12 points and displaying information at a position about 100 m from a user with 6 points. In this manner, a character size may be determined by linearly complementing the result of calculating a distance from a detected region to a user. Alternatively, characters also may be displayed with different colors depending on the distance from a user as described above by displaying information closer to a user with characters having a darker color and by displaying information farther away from a user with characters having a lighter color. Alternatively, information also may be displayed with different chroma saturations or luminances of the color of a speech bubble depending on the distance from a user by displaying information farther away from a user with a speech bubble having a lighter color and by displaying information closer to a user with a speech bubble having a more conspicuous color. Alternatively, information also may be displayed with different transparencies of a speech bubble depending on the distance from a user by displaying information farther away from a user with a more transparent speech bubble so that the speech bubble is less noticed by the user. As described above, by using display modes by characters of different sizes, colors, or shapes, information corresponding to a detection distance can be displayed in accordance with the result of measuring a distance of the detected region.

According to this application example, the imaging apparatus 100 can use information acquired from another information source (e.g., billboard 60, imaging apparatus 100) as information to be sent therefrom. Thus, compared with a wireless communication requiring a large-size system, information can be transmitted in a wide range without requiring increased traffic or communication cost.

Although this application example has described a case where the present invention is applied to the imaging apparatus 10 (imaging apparatuses 100A and 100B), the present invention is not limited to this example. For example, the present invention can be also applied to general electronic cameras (e.g., a mobile telephone equipped with a camera, a mobile imaging apparatus equipped with a camera).

What is claimed is:

1. A method comprising:
    determining whether a luminance received by at least one light receiving element of a plurality of light receiving elements of an apparatus is equal to or higher than a predetermined value;
    determining whether luminances received by the at least one light receiving element that has received the luminance are equal to or higher than the predetermined value change in a time-series manner;
    acquiring information relating to a size of a light source from the time-series change when it is determined that the luminances change in the time-series manner;
    detecting a size of a light receiving region based on a ratio of the at least one light receiving element that has received the luminances that change in the time-series manner to the plurality of light receiving elements; and
    calculating a distance from the apparatus to the light source based on the size of the light receiving region and the acquired information relating to the size of the light source;
    wherein the information relating to the size of the light source is contained in the luminances that change in the time-series manner provided by the light source.

2. The method according to claim 1, further comprising:
    determining a shape of the light receiving region, wherein the distance from the apparatus to the light source is calculated based on the size of the light receiving region, the acquired information relating to the size of the light source, and the shape of the light receiving region.

3. The method according to claim 1, further comprising controlling imaging operation-related processings based on the calculated distance.

4. The method according to claim 3, wherein the imaging operation-related processings include reproduction or storage of information acquired from the time-series change, based on the calculated distance.

5. The method according to claim 3, wherein the imaging operation-related processings include a processing for displaying imaging-related auxiliary information based on the calculated distance.

6. The method according to claim 3, wherein the imaging operation-related processings include a processing for controlling a focusing section based on the calculated distance.

7. The method according to claim 3, wherein the imaging operation-related processings include a processing for processing an imaged image based on the calculated distance.

8. The method according to claim 3, wherein the imaging operation-related processings include a processing for controlling an optical system mechanism based on the calculated distance.

9. The method according to claim 1, further comprising controlling a display mode of displaying information acquired from the time-series change on a display section.

10. The method according to claim 9, wherein the controlling of the display mode comprises displaying the acquired information with images imaged by the plurality of light receiving elements.

11. The method according to claim 9, wherein the controlling of the display mode comprises displaying the acquired information in association with the image of the light source included in the images imaged by the plurality of light receiving elements.

12. An apparatus, comprising:
    a light receiving section including a plurality of light receiving elements;
    a first determination section to determine whether a luminance received by at least one of the plurality of light receiving elements is equal to or higher than a predetermined value;
    a second determination section to determine whether luminances received by the at least one light receiving element that has received the luminance are equal to or higher than the predetermined value change in a time-series manner;
    an acquisition section to acquire information relating to a size of a light source from the time-series change when it is determined that the luminances change in the time-series manner;
    a detection section to detect a size of a light receiving region based on a ratio of the at least one light receiving element having received the luminances that change in the time-series manner to the plurality of light receiving elements; and
    a calculation section to calculate a distance from the apparatus to the light source based on the size of the light receiving region and the acquired information relating to the size of the light source;
    wherein the information relating to the size of the light source is contained in the luminances that change in the time-series manner provided by the light source.

13. A computer-readable storage medium having a program stored thereon that is executable by a computer of an apparatus to perform functions comprising:
    determining whether a luminance received by at least one light receiving element of a plurality of light receiving elements of the apparatus are equal to or higher than a predetermined value;
    determining whether luminances received by the at least one light receiving element that has received the luminance are equal to or higher than the predetermined value change in a time-series manner;
    acquiring information relating to a size of a light source from the time-series change when it is determined that the luminances change in the time-series manner;
    detecting a size of a light receiving region based on a ratio of the at least one light receiving element that has received luminances that change in the time-series manner to the plurality of light receiving elements; and
    calculating a distance from the apparatus to the light source based on the size of the light receiving region and the acquired information relating to the size of the light source;
    wherein the information relating to the size of the light source is contained in the luminances that change in the time-series manner provided by the light source.

14. A distance measuring system comprising:
    (i) a light source including:
        a modulation section to modulate information relating to a size of the light source to a time-series luminance change; and
        a luminance section which emits light having the time-series luminance change; and
    (ii) a light receiving apparatus including:
        a light receiving section which includes a plurality of light receiving elements and which receives the light from the light source;
        a demodulation section to demodulate the time-series luminance change of the light received by the light receiving section to acquire the information relating to the size of the light source;

a detection section to detect a size of a light receiving region based on a ratio of an area of the light receiving elements that received the light to the plurality of light receiving elements; and a measurement section to measure, based on the size of the region detected by the detection section and the information relating to the size of the light source acquired by the demodulation section, a distance between the light source and a position of the light receiving apparatus.

15. A light source apparatus, comprising:

a light source;

a modulation section to modulate information relating to a size of the light source to a time-series luminance change; and a luminance section that controls the light section to emit light having the time-series luminance change, wherein the emitted light having the time-series luminance change is receivable by a light receiving apparatus to enable the light receiving apparatus to calculate a distance to the light source.

16. The method according to claim 1, further comprising:

acquiring information relating to a shape of the light source from the time-series change; and determining a shape of the light receiving region, wherein the distance from the apparatus to the light source is calculated based on the size of the light receiving region, the acquired information relating to the size of the light source, the shape of the light receiving region, and the acquired information relating to the shape of the light source.

17. The method according to claim 1, further comprising controlling display of information acquired from the time-series change based on the calculated distance.

* * * * *